United States Patent
Asada et al.

(10) Patent No.: US 7,463,295 B2
(45) Date of Patent: Dec. 9, 2008

(54) CHARACTERISTIC CORRECTION APPARATUS FOR GAMMA CORRECTING AN IMAGE BASED ON THE IMAGE TYPE

(75) Inventors: Ryoji Asada, Osaka (JP); Akihiro Takeuchi, Nara (JP); Akira Usui, Osaka (JP); Yoshitaka Sakamoto, Tokyo (JP); Takayuki Kimoto, Osaka (JP); Tamotsu Akeyama, Osaka (JP)

(73) Assignee: Panasonic Corporation, Osaka (JP)

( * ) Notice: Subject to any disclaimer, the term of this patent is extended or adjusted under 35 U.S.C. 154(b) by 619 days.

(21) Appl. No.: 10/498,968

(22) PCT Filed: Jun. 24, 2003

(86) PCT No.: PCT/JP03/07951

§ 371 (c)(1),
(2), (4) Date: Jun. 16, 2004

(87) PCT Pub. No.: WO2004/004328

PCT Pub. Date: Jan. 8, 2004

(65) Prior Publication Data

US 2005/0104987 A1     May 19, 2005

(30) Foreign Application Priority Data

Jun. 26, 2002    (JP)   ............................ 2002-185764
Oct. 4, 2002    (JP)   ............................ 2002-292163

(51) Int. Cl.
*H04N 5/202*     (2006.01)
*H04N 5/76*     (2006.01)
*H04N 9/69*     (2006.01)
*G03F 3/08*     (2006.01)

(52) U.S. Cl. .................... 348/254; 348/231.6; 348/675; 358/519

(58) Field of Classification Search .............. 348/231.3, 348/231.6, 254–256, 671, 675; 358/519
See application file for complete search history.

(56) References Cited

U.S. PATENT DOCUMENTS 5,589,954 A * 12/1996 Watanabe .................... 358/518

(Continued)

FOREIGN PATENT DOCUMENTS

CN     1216423 A     5/1995

(Continued)

OTHER PUBLICATIONS

Japanese International Search Report for PCT/JP03/07951, dated Oct. 28, 2003.

(Continued)

*Primary Examiner*—John M Villecco
(74) *Attorney, Agent, or Firm*—RatnerPrestia

(57) ABSTRACT

The present invention includes a film or video image pickup signal recording/reproduction system having an image pickup apparatus outputting an image pickup signal, a recording apparatus recording the image pickup signal, a reproduction apparatus reproducing the recorded signal, a characteristic conversion apparatus switching the characteristic of the reproduced signal, and a display apparatus displaying the signal output from the characteristic conversion apparatus. The image pickup apparatus has two kinds of gamma curve characteristics. The gamma curve characteristic data is recorded by the recording apparatus and extracted by the reproduction apparatus. The gamma curve characteristic of a reproduction image is switched by the characteristic conversion apparatus depending on the data. The image is output on a display apparatus.

16 Claims, 18 Drawing Sheets

U.S. PATENT DOCUMENTS

| | | | |
|---|---|---|---|
| 5,606,630 | A | 2/1997 | Maeda et al. |
| 5,949,496 | A * | 9/1999 | Kim .................... 348/645 |
| 6,181,444 | B1 * | 1/2001 | Sato .................... 358/519 |
| 6,320,668 | B1 | 11/2001 | Kim |
| 6,594,387 | B1 * | 7/2003 | Pettitt et al. ............. 382/167 |
| 6,611,290 | B1 * | 8/2003 | Sato .................. 348/333.01 |
| 6,697,127 | B2 * | 2/2004 | Suzuki .................. 348/674 |
| 6,727,959 | B2 * | 4/2004 | Eskin .................. 348/674 |
| 7,088,390 | B2 * | 8/2006 | Mori et al. ............. 348/254 |
| 7,253,845 | B2 * | 8/2007 | Rumreich et al. ......... 348/649 |
| 2002/0145678 | A1 | 10/2002 | Suzuki et al. |
| 2003/0174216 | A1 | 9/2003 | Iguchi et al. |

FOREIGN PATENT DOCUMENTS

| | | |
|---|---|---|
| EP | 0 507 253 A2 | 10/1992 |
| JP | 06-253147 | 9/1994 |
| JP | 06-284433 | 10/1994 |
| JP | 10-079887 A | 3/1998 |
| JP | 11-261923 A | 9/1999 |
| JP | 2001-169143 | 6/2001 |
| JP | 2001-203933 A | 7/2001 |
| JP | 2001-298750 | 10/2001 |
| JP | 2002-084455 A | 3/2002 |
| JP | 2002-135589 A | 5/2002 |
| JP | 2002-152569 | 5/2002 |
| JP | 2002-262303 A | 9/2002 |
| JP | 2003-230022 A | 8/2003 |
| JP | 2003-339057 | 11/2003 |

OTHER PUBLICATIONS

Chinese Office Action for Application No. 03801475.0, dated Jan. 20, 2006 (with English translation thereof).

Supplementary European Search Report for EP 03 76 1777, dated Jan. 7, 2005.

Korean Office Action dated Feb. 28, 2006.

Japanese Office Action for Application No. 2004-548901, dated Mar. 14, 2006.

* cited by examiner

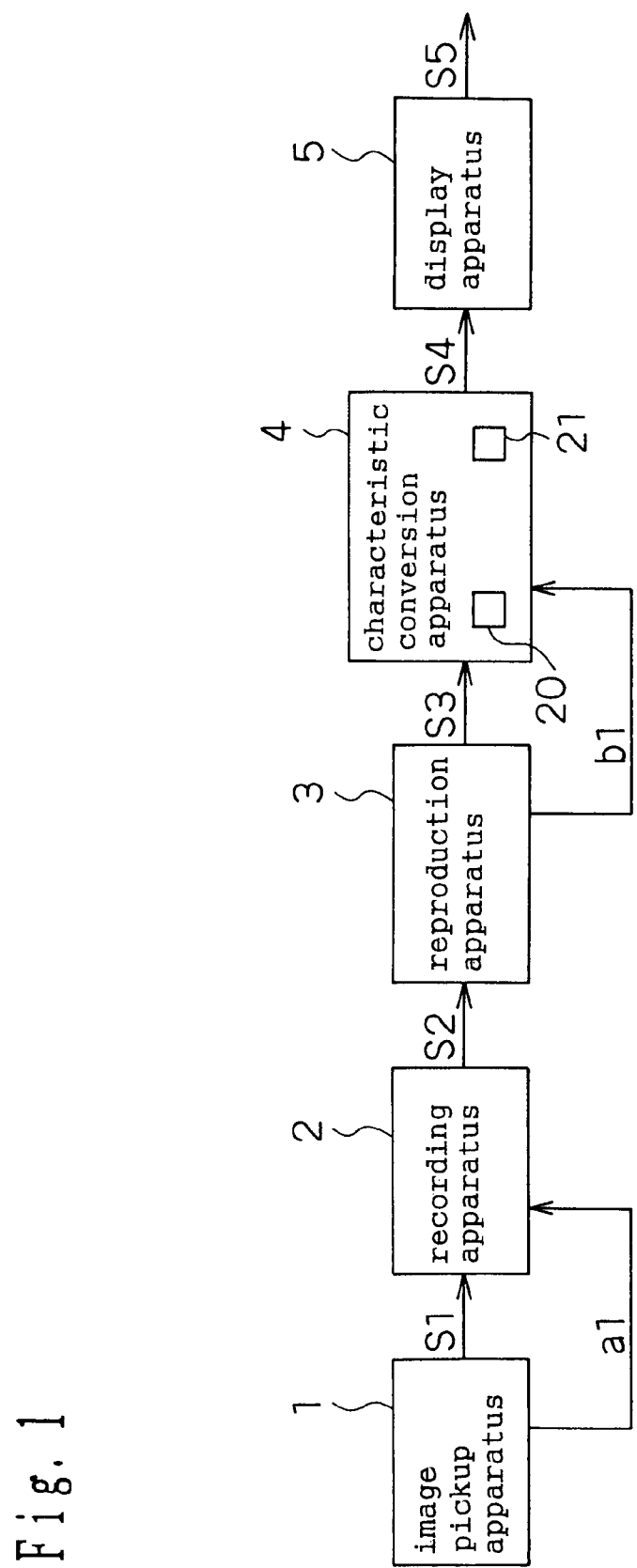

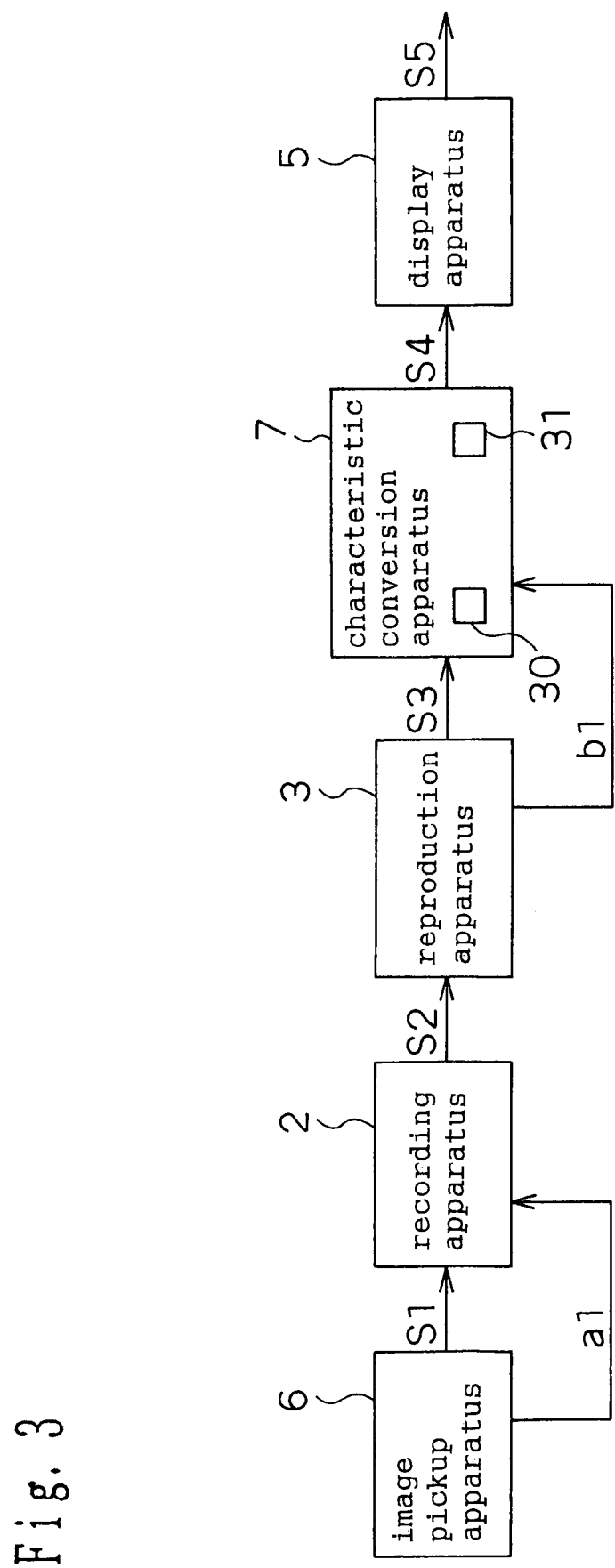

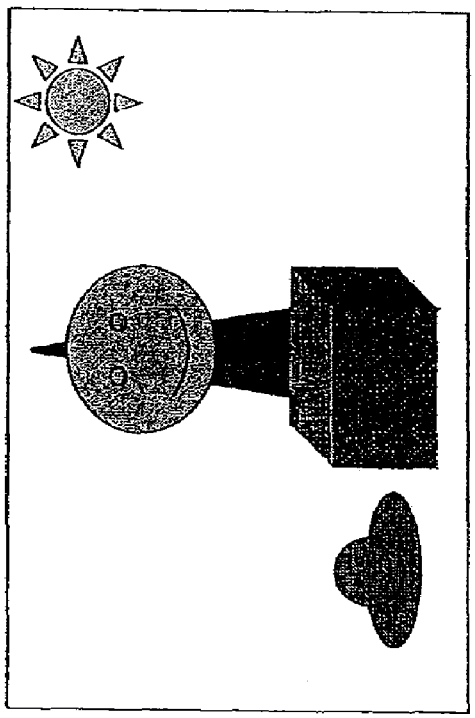
Fig. 13 (b) PRIOR ART
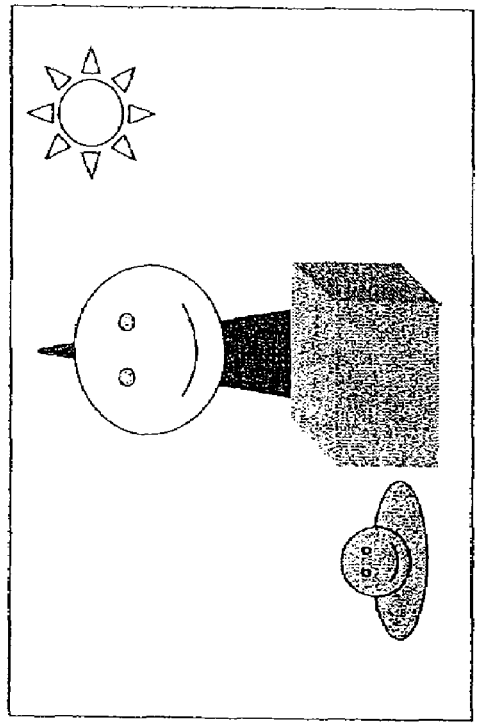
Fig. 13 (a) PRIOR ART

CHARACTERISTIC CORRECTION APPARATUS FOR GAMMA CORRECTING AN IMAGE BASED ON THE IMAGE TYPE

THIS APPLICATION IS A U.S. NATIONAL PHASE APPLICATION OF PCT INTERNATIONAL APPLICATION PCT/JP2003/007951.

TECHNICAL FIELD

The present invention relates to a characteristic correction apparatus of correcting the characteristic of an image pickup signal, an image pickup/reproduction system, a characteristic correction method, a program therefor and a recording medium.

BACKGROUND TECHNOLOGY

A system of carrying out recording and reproduction by using a signal used for ordinary television broadcasting and the like (hereafter referred to as a video signal) is shown in FIG. 11. In FIG. 11, numeral 101 designates an image pickup apparatus, numeral 102 designates a recording apparatus, numeral 103 designates a reproduction apparatus, and numeral 105 designates a display apparatus. The image pickup apparatus 101 is generally referred to as a television camera or a video camera and outputs a video signal. The recording apparatus 102 is a VTR (Video Tape Recorder) or a disc recorder of recording the output signal of the image pickup apparatus 101, and the reproduction apparatus 103 reproduces a signal depending on information recorded on a recording medium by the recording apparatus 102. The display apparatus 105 displays the output signal from the reproduction apparatus 103. In addition, the display apparatus 105 may directly display the signal from the image pickup apparatus 101.

On the other hand, needs for making movies electronic are increasing owing to the progress of HD (High Definition) broadcasting equipment in recent years. In other words, demand for electronic cinema systems and the like wherein a video signal to be recorded on a film (hereafter referred to as a film signal) is recorded on a video tape or the like is increasing. Hence, the image pickup apparatus 101 shown in FIG. 11 is required to have a function capable of handling both the film signal and the video signal. To meet these needs, in the image pickup apparatus 101, conversion is carried out so that an image picked up is output as a film signal.

The operation of a conventional film or video image pickup signal recording/reproduction system will be described below by using FIGS. 11 and 12.

When a video signal used for ordinary television broadcasting and the like is processed in the configuration of the system shown in FIG. 11, the image pickup apparatus 101 outputs an image pickup signal having a format of 1080/60i (i: interlace, hereafter represented by i) or 720/60p (p: progressive, hereafter represented by p) in the case of the HD system. The recording apparatus102, the reproduction apparatus 103 and the display apparatus 105, connected on the output side of the image pickup apparatus 101, also conform to the system matching the format of the image pickup signal of the image pickup apparatus 101. The field frequency is basically fixed at 60 Hz, although it differs depending on the scanning system (i or p).

In addition, with respect to a gamma characteristic, a video signal gamma curve (a gamma curve for a broadcasting camera) shown in FIG. 12 is used. In FIG. 12, an input light amount of 100% is an input light amount having a value of 100 IRE (0.7 VPP) (regarding the level of the output signal, 0.7 VPP is taken as 100% and represented by 100 IRE) as the level of the output signal of the image pickup apparatus 101. The specifications of the video signal gamma curve are determined as described above (the broadcasting camera standard: ITU-R BT709). Furthermore, the aperture adjustment of the image pickup apparatus 101 is carried out so that the level of flesh color becomes 60 to 70 IRE. FIG. 13($a$) shows a state obtained when the output of the image pickup apparatus 101 using this kind of video signal gamma curve is viewed by the display apparatus 105, such as a CRT monitor, based on the specifications of the gamma curve for a broadcasting camera.

On the other hand, when a film signal is processed in the system shown in FIG. 11, the frame frequency is basically 24Hz (the frame frequency of a movie) and the scanning system is 24p (24progressively-scanned signal) in the image pickup apparatus 101. In addition, in order that variable-speed image pickup is attained just as in the case of a film camera, it is required to obtain image pickup signals having various frame rates. Furthermore, in that case, the recording apparatus 102, the reproduction apparatus 103 and the display apparatus 105, provided on the output side of the image pickup apparatus 101, are also required to conform to the various frame rates. With respect to this, in Japanese Laid-open Patent Application No. 2002-152569 applied by the applicant of the present invention, processing conforming to the above-mentioned various frame rates by using a conventional video image pickup apparatus has been proposed. By this proposal, processing for a variable frame frequency is made easy.

In addition, when a film signal is generated by using the image pickup apparatus 101, the image pickup apparatus 101 is required to have gradation in a wide dynamic range. For this purpose, as shown in FIG. 12, the operation of almost linearly converting the gradations of all the signals in the dynamic range by using the film signal gamma curve characteristic, instead of making correction by using the conventional video signal gamma curve characteristic, has been introduced to video camera recorders in recent years. When the signal obtained in this way is recorded finally on a film, it is recorded on the film via a conversion table matching the characteristic of the film.

As described above, even if an image pickup signal recording/reproduction system of processing a video signal is used, by modifying part thereof, it has become possible to configure an image pickup signal recording/reproduction system for a film signal.

However, in the above-mentioned conventional image pickup signal recording/reproduction system, when the image pickup apparatus 101 outputs a film signal, the image pickup apparatus 101 uses a gamma curve characteristic (see the film signal gamma curve shown in FIG. 12) wherein the gradations of all the signals in the dynamic range are made almost uniform, whereby the image pickup signal reproduced by the display apparatus 105 is wholly dark as shown in FIG. 13($b$) in comparison with the case when a video signal is output, and an image with low contrast is obtained. For example, the level of the output signal is 50 to 60 IRE and the level of the flesh color of a human face becomes 30 to 40 IRE when the input light amount is 100%. This causes a problem of making the confirmation of the image pickup signal difficult.

DISCLOSURE OF THE INVENTION

In consideration of the above-mentioned problems, the present invention is intended to provide a characteristic correction apparatus, an image pickup/reproduction system, a characteristic correction method, a program therefor and a recording medium, capable of providing images easily recognizable on a monitor, even when the image pickup apparatus 101 outputs a film signal.

To solve the above problems, a 1st aspect of the present invention is a characteristic correction apparatus comprising:

a storage section in which correction information of correcting a first image pickup signal into a second image pickup signal is stored, and a correction section of correcting a predetermined characteristic so that said first image pickup signal input is corrected to said second image pickup signal by using said correction information.

A 2nd aspect of the present invention is a characteristic correction apparatus in accordance with the 1st aspect of the present invention, wherein in a display apparatus of displaying said second image pickup signal, said predetermined characteristic is corrected depending on the image pickup information regarding said first image pickup signal to the extent that an image obtained in the case when said second image pickup signal is displayed is clearer than an image obtained in the case when said first image pickup signal is displayed.

A 3rd aspect of the present invention is a characteristic correction apparatus in accordance with the 1st aspect of the present invention, wherein said predetermined characteristic is a gamma characteristic that determines the relationship between an incident light amount and an output signal in an image pickup apparatus. A 4th aspect of the present invention is a characteristic correction apparatus in accordance with the 1st aspect of the present invention, wherein said first image pickup signal is an image pickup signal having a film gamma characteristic and said second image pickup signal is an image pickup signal having a predetermined gamma characteristic, and said predetermined gamma characteristic is a gamma characteristic depending on which a signal larger than an output signal obtained from said film gamma characteristic and not larger than an output signal obtained from a video gamma characteristic is obtained at any given incident light amount used during image pickup.

A 5th aspect of the present invention is a characteristic correction apparatus in accordance with the 1st aspect of the present invention, wherein said correction information is a table or a mathematical expression of carrying out correction by one-to-one correspondence between said first image pickup signal and said second image pickup signal.

A 6th aspect of the present invention is a characteristic correction apparatus in accordance with the 4th aspect of the present invention, wherein of said predetermined gamma characteristic, the number of bits allocated for said signal output in the range of more than said predetermined value is larger than the number of bits allocated for said signal output in the range of said predetermined value or less, and said predetermined value is a value at which 100% signal output is obtained according to the signal output value at the knee point of said video gamma characteristic or the ITU-R BT709 Standard.

A 7th aspect of the present invention is a characteristic correction apparatus in accordance with the 4th aspect of the present invention, wherein said predetermined gamma characteristic is obtained when a signal having a level of 50 to 60% of that of said first image pickup signal is corrected to a signal having a level of substantially 80% or more in the ITU-R BT709 Standard.

An 8th aspect of the present invention is a characteristic correction apparatus in accordance with the 4th aspect of the present invention, wherein said predetermined gamma characteristic is obtained when a signal having a level of 30 to 40% of that of said first image pickup signal is corrected to a signal having a level of 60 to 70% in the ITU-R BT709 Standard.

A 9th invention of the present invention is a characteristic correction apparatus in accordance with the 1st aspect of the present invention, wherein said first image pickup signal is corrected to said second image pickup signal and then output or said first image pickup signal is directly output, depending on the kind of said first image pickup signal.

A 10th aspect of the present invention is a characteristic correction apparatus in accordance with the 4th aspect of the present invention, wherein said correction information includes information of correcting said first image pickup signal to said second image pickup signal having a plurality of gamma characteristics different in characteristics, and said second image pickup signal is obtained on the basis of one of said plurality of gamma characteristics depending on the kind of said first image pickup signal.

An 11th aspect of the present invention is a characteristic correction apparatus in accordance with the 1st aspect of the present invention, wherein information regarding said first image pickup signal is output together with said second image pickup signal depending on the kind of said first image pickup signal.

A 12th aspect of the present invention is a characteristic correction apparatus in accordance with the 4th aspect of the present invention, wherein said correction is carried out for at least one of (1) R, G, B, (2) Y, Pb, Pr and (3) only Y of Y, Pb, Pr.

A 13th aspect of the present invention is an image pickup/reproduction system comprising:

an image pickup apparatus of picking up an image of an object to be subjected to image pickup and outputting a first image pickup signal, a characteristic correction apparatus in accordance with the first invention to which the first image pickup signal output from said image pickup apparatus is input, and a display apparatus of displaying said second image pickup signal.

A 14th aspect of the present invention is an image pickup/reproduction system in accordance with the 13th aspect of the present invention, further comprising:

a color correction apparatus of color-correcting the image pickup signal, wherein said color correction apparatus color-corrects said first image pickup signal input to said characteristic correction apparatus by using said second image pickup signal output from said characteristic correction apparatus.

A 15th aspect of the present invention is a characteristic correction method of correcting a predetermined characteristic so that said first image pickup signal having been input is corrected to said second image pickup signal by using correction information, stored in the storage section, of correcting the first image pickup signal to the second image pickup signal.

A 16th aspect of the present invention is a program of operating a computer as a correction section of said characteristic correction apparatus in accordance with the 1st aspect of the present invention of correcting the predetermined characteristic so that said first image pickup signal having been input is corrected to said second image pickup signal by using said correction information.

A 17th aspect of the present invention is a recording medium having the program in accordance with the 16th aspect of the present invention and being processable by a computer.

BRIEF DESCRIPTION OF THE DRAWINGS

FIG. 1 is a block diagram showing the configuration of a film or video image pickup signal recording/reproduction system in accordance with Embodiment 1 of the present invention;

FIG. 3 is a block diagram showing the configuration of a film or video image pickup signal recording/reproduction system in accordance with Embodiment 2 of the present invention;

FIGS. 13(a) and 13(b) are display image views each showing an output example of the image on the display apparatus 105 of the conventional film or video image pickup signal recording/reproduction system;

Figure 2B:
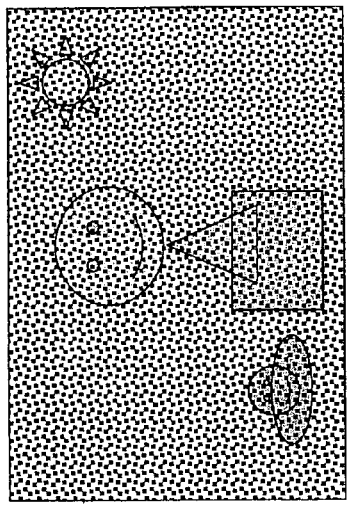
FIGS. 2(a)-2(c) are display image views each showing an output example of an image on a display apparatus 5 in accordance with Embodiment 1 of the present invention.

EXPLANATION OF NUMERALS 1, 6, 10 image pickup apparatus
2 recording apparatus
3 reproduction apparatus
4, 7, 11 characteristic conversion apparatus
5, 12 display apparatus
8 gamma conversion circuit
9 switching circuit

THE BEST MODE FOR CARRYING OUT THE INVENTION

Embodiments in accordance with the present invention will be described below by using the drawings.

EMBODIMENT 1

FIG. 1 is a block diagram showing the configuration of an image pickup/reproduction system in accordance with Embodiment 1 of the present invention.

Figure 11:
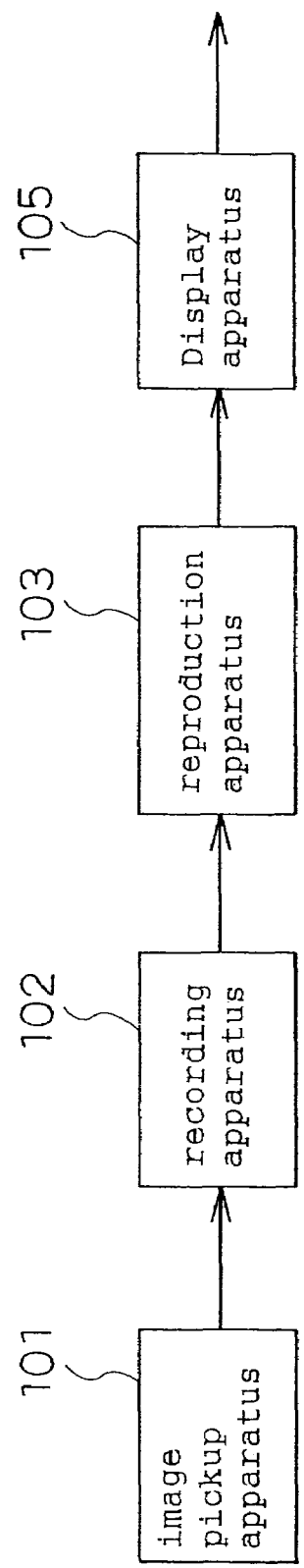
FIG. 11 is a block diagram showing the configuration of the conventional film or video image pickup signal recording/reproduction system.
Figure 12:
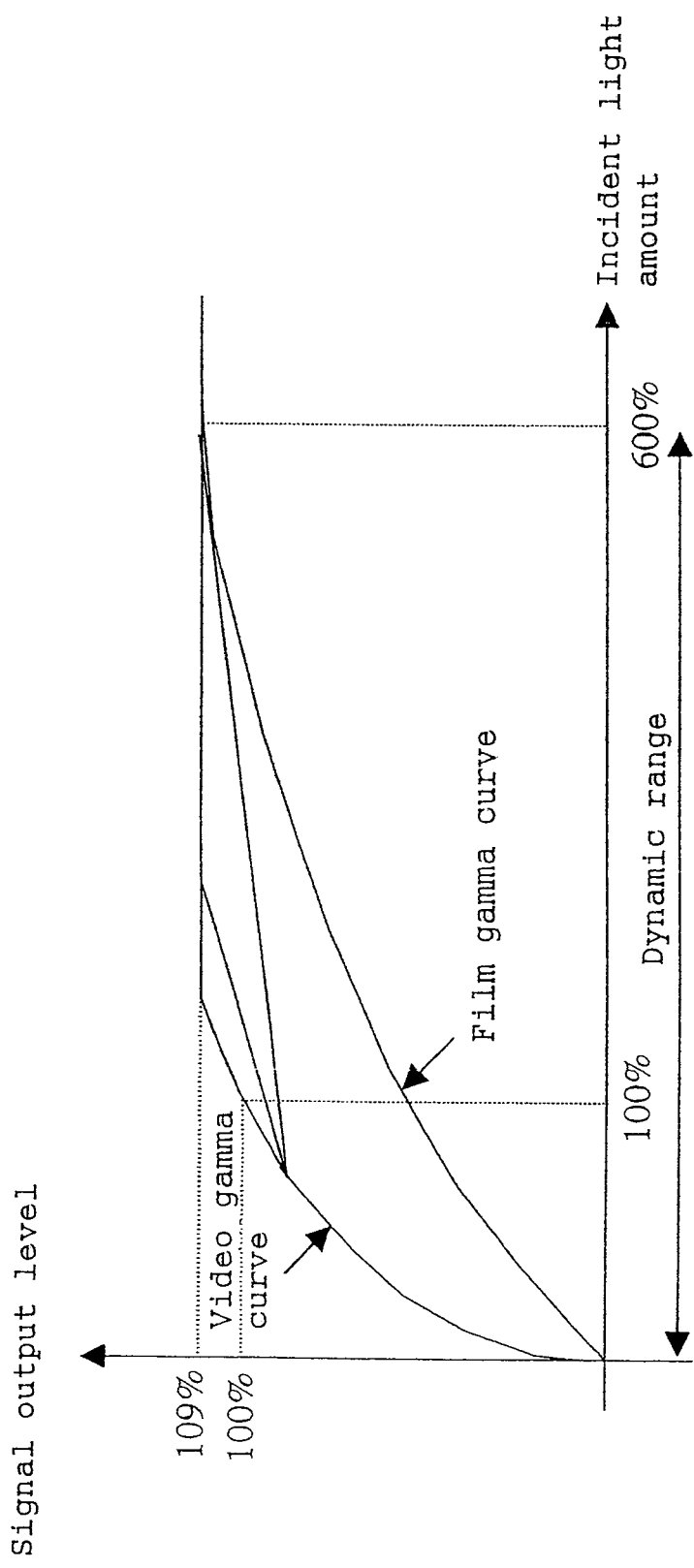
FIG. 12 is an explanatory view showing video and film gamma characteristics.

In FIG. 1, numeral 1 designates an image pickup apparatus of outputting an image pickup signal available in various kinds, and numeral 2 designates a recording apparatus of recording the output signal of the image pickup apparatus, Numeral 3 designates a reproduction apparatus of reproducing the output signal of the recording apparatus 2, Numeral 4 designates a characteristic conversion apparatus for switching the characteristic of the output signal of the reproduction apparatus 3, in accordance with an example of a characteristic conversion apparatus of the present invention, Numeral 5 designates a display apparatus for displaying the output signal of the characteristic conversion apparatus 4. The characteristic conversion apparatus 4 includes a storage section 20 for storing a noise reduction amount depending on a gain increase amount determined on the basis of the image pickup state of the image pickup apparatus 1 and a correction section 21 for carrying out noise reduction processing. This configuration differs from that of the conventional example shown in FIG. 11 in that the characteristic conversion apparatus 4 having the above-mentioned configuration is added as a component.

The operation of the image pickup/reproduction system in accordance with Embodiment 1 configured as described above will be described below.

The image pickup apparatus 1 outputs an image pickup signal S1 available in various kinds as a film signal or a video signal. The image pickup apparatus 1 differs from the image pickup apparatus 101 of the conventional example in that an image pickup information signal a1 indicating the image pickup state is also output simultaneously with the image pickup signals S1. As this kind of image pickup information signal a1, gain increase information is taken as an example. The recording apparatus 2 records the image pickup signal S1 and the image pickup information signal a1 from the image pickup apparatus 1 without modification. The reproduction apparatus 3 receives a record signal S2 from the recording apparatus 2, reproduces the image pickup signal itself and outputs a reproduction signal S3 serving as an example of a first image pickup signal of the present invention, and further extracts the image pickup information signal a1 and outputs a control signal b1 based on the image pickup information signal a1 to the characteristic conversion apparatus 4.

Figure 2C:
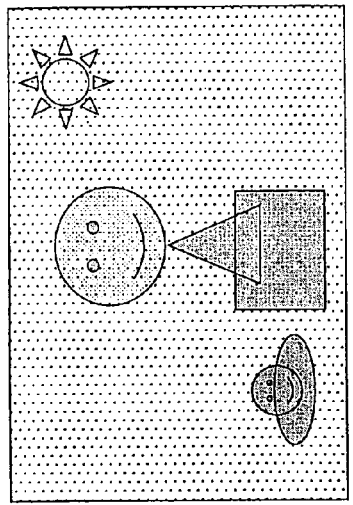

In the characteristic conversion apparatus 4, the correction section 21 converts the characteristic of the reproduction signal S3, input from the reproduction apparatus, on the basis of the control signal b1, having been input, and uses the noise reduction amount stored in the storage section 20 and outputs an output signal S4, as an example of a second image pickup signal of the present invention, to the display apparatus 5. In this embodiment, the characteristic conversion apparatus 4 carries out noise reduction processing depending on the gain increase amount on the basis of the gain increase information included in the control signal b1. The display apparatus 5 faithfully displays an input signal, just as in the case of the conventional example. An image output example on the display apparatus 5 in accordance with this embodiment is shown in FIG. 2.

Figure 2A:
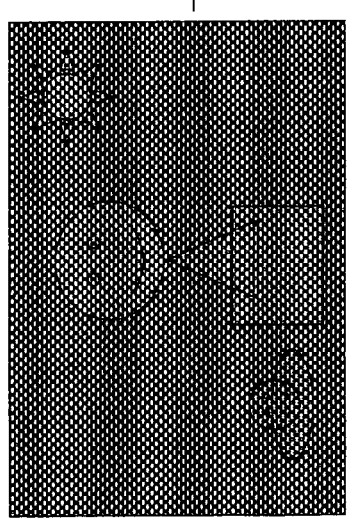

FIG. 2(a) shows an example of an object's image picked up by the image pickup apparatus 1 and shows the image in a very dark state. An image of this object is picked up by the image pickup apparatus 1 while the gain is increased (an increase of 36 dB, for example), and the image obtained when its reproduction signal is displayed on the display apparatus 5 without modification is shown in FIG. 2(b), just as in the case of the conventional example shown in FIG. 11. By the increase of the gain, the whole image becomes bright, and the object can be confirmed; however, noise is emphasized simultaneously, and the whole image becomes unclear. On the other hand, in the image pickup/reproduction system in accordance with this embodiment, the characteristic is switched by the characteristic conversion apparatus 4 depending on the state of image pickup (the image pickup information signal a1 indicating a gain increase of 36 dB). In other words, in the characteristic conversion apparatus 4, the noise reduction amount is selected depending on the level of the gain increase. As a result, in the display apparatus 5, a clear image in which noise reduction is optimized can be obtained. The noise reduction processing can be attained by relatively simple processing, such as field addition, in the case of a still image in particular.

As described above, in the image pickup/reproduction system in accordance with Embodiment 1 of the present invention, the characteristic of a signal picked up by the image pickup apparatus 1 can be converted by the characteristic conversion apparatus 4 depending on the image pickup information signal a1 and output to the display apparatus 5, whereby its image can be displayed in a relatively optimum state or confirmed on the display apparatus 5 regardless of any image pickup state.

Furthermore, in this embodiment, the image pickup information signal a1 may be information other than gain increase and may be information regarding gain, frequency, etc. of detail processing; in such a case, an effect similar to that described above can be obtained if noise reduction is carried out depending on these image pickup information signals a1. In that case, noise reduction information corresponding to each image pickup information signal a1 is stored in the storage section 20 of the characteristic conversion apparatus 4.

In addition, in the characteristic conversion apparatus 4, processing other than noise reduction may be carried out depending on the image pickup information signal a1. In that case, information regarding each process corresponding to each image pickup information signal a1 is stored in the storage section 20 of the characteristic conversion apparatus 4.

Furthermore, even if the image pickup information signal a1 is not output from the image pickup apparatus 1, it is presumable that the reproduction apparatus 3 extracts an image pickup state (the amount of noise, for example) from an image pickup signal recorded in the recording apparatus 2 and sets it as the image pickup information signal a1. Even in such a case, an effect similar to that described above can be obtained.

Still further, it is needless to say that an image pickup record signal having high image quality and high performance can be obtained by replacing image pickup record data for use in an actual system with a signal obtained by the characteristic conversion apparatus 4 and by using the signal.

EMBODIMENT 2

FIG. 3 is a block diagram showing the configuration of an image pickup/reproduction system in accordance with Embodiment 2 of the present invention.

In FIG. 3, numeral 6 designates an image pickup apparatus of outputting an image pickup signal available in various kinds, numeral 2 designates a recording apparatus of recording the output signal of the image pickup apparatus 6, numeral 3 designates a reproduction apparatus of reproducing the output signal of the recording apparatus 2, numeral 7 designates a characteristic conversion apparatus of converting the characteristic of the output signal of the reproduction apparatus 3 in accordance with an example of an characteristic conversion apparatus of the present invention, and numeral 5 designates a display apparatus of displaying the output signal of the characteristic conversion apparatus 7. The characteristic conversion apparatus 7 includes a gamma conversion circuit 8 and a switching circuit 9 (see FIG. 5). The gamma conversion circuit 8 is a circuit of converting the gamma curve characteristic of the input signal, and the switching circuit 9 is a circuit of making switching as to whether a signal having been input depending on the control signal b1 is output directly or output via the gamma conversion circuit 8. Embodiment 2 differs from Embodiment 1 in that the image pickup apparatus 6 has gamma curve characteristics capable of being classified into two kinds, that is, film and video gamma curve characteristics, and that the characteristic conversion apparatus 7 has a gamma characteristic conversion section of converting all the gamma curve characteristics into one kind of gamma curve characteristic. The other apparatuses serving as the components of the configuration are similar and their explanations are omitted.

Figure 4:
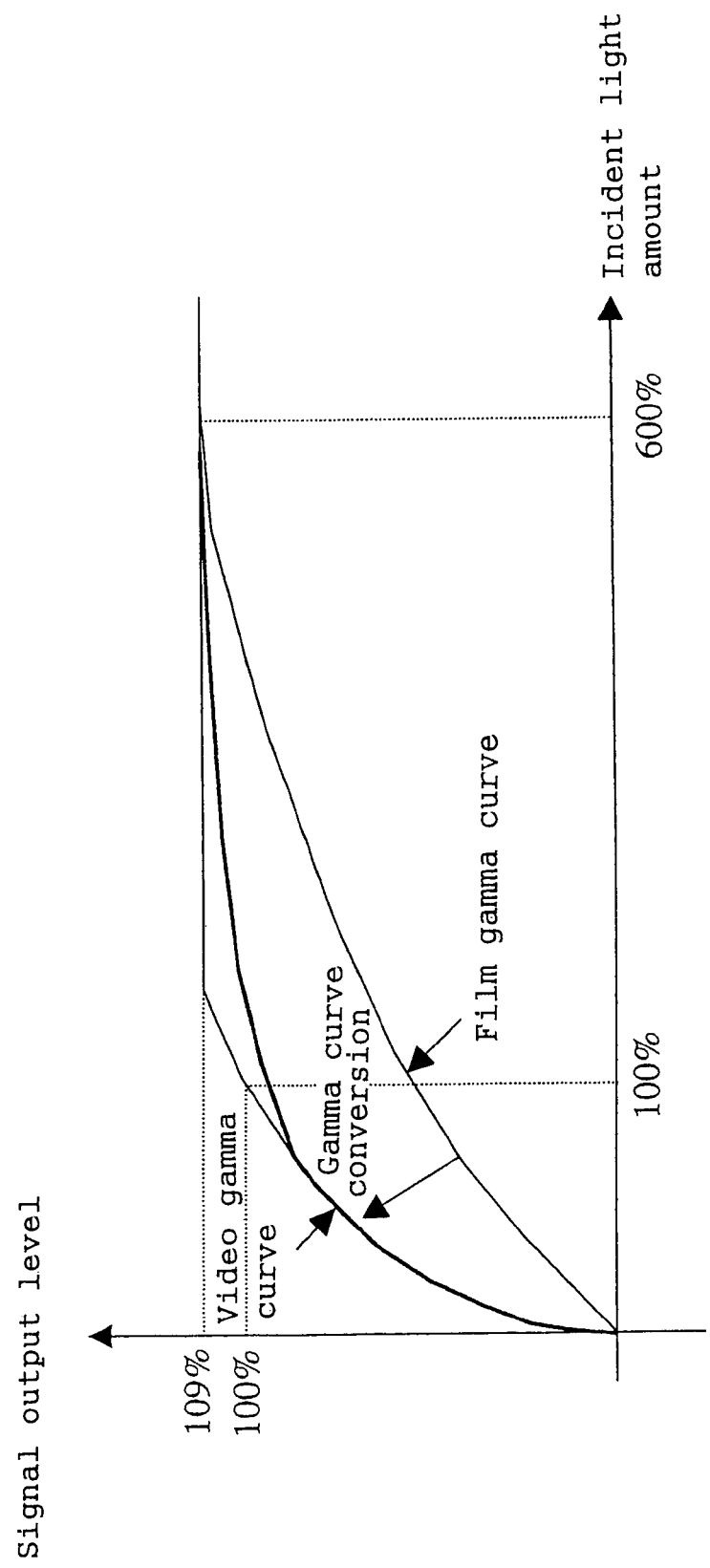
FIG. 4 is a characteristic diagram showing examples of gamma curve characteristics provided in an image pickup apparatus 6 in accordance with Embodiment 2 of the present invention.

FIG. 4 is a characteristic diagram showing examples of two kinds of gamma curve characteristics provided in the image pickup apparatus 6. The curve positioned upper in FIG. 4 corresponds to the video signal gamma curve characteristic, and the curve positioned lower corresponds to the film signal gamma curve characteristic.

Figure 5:
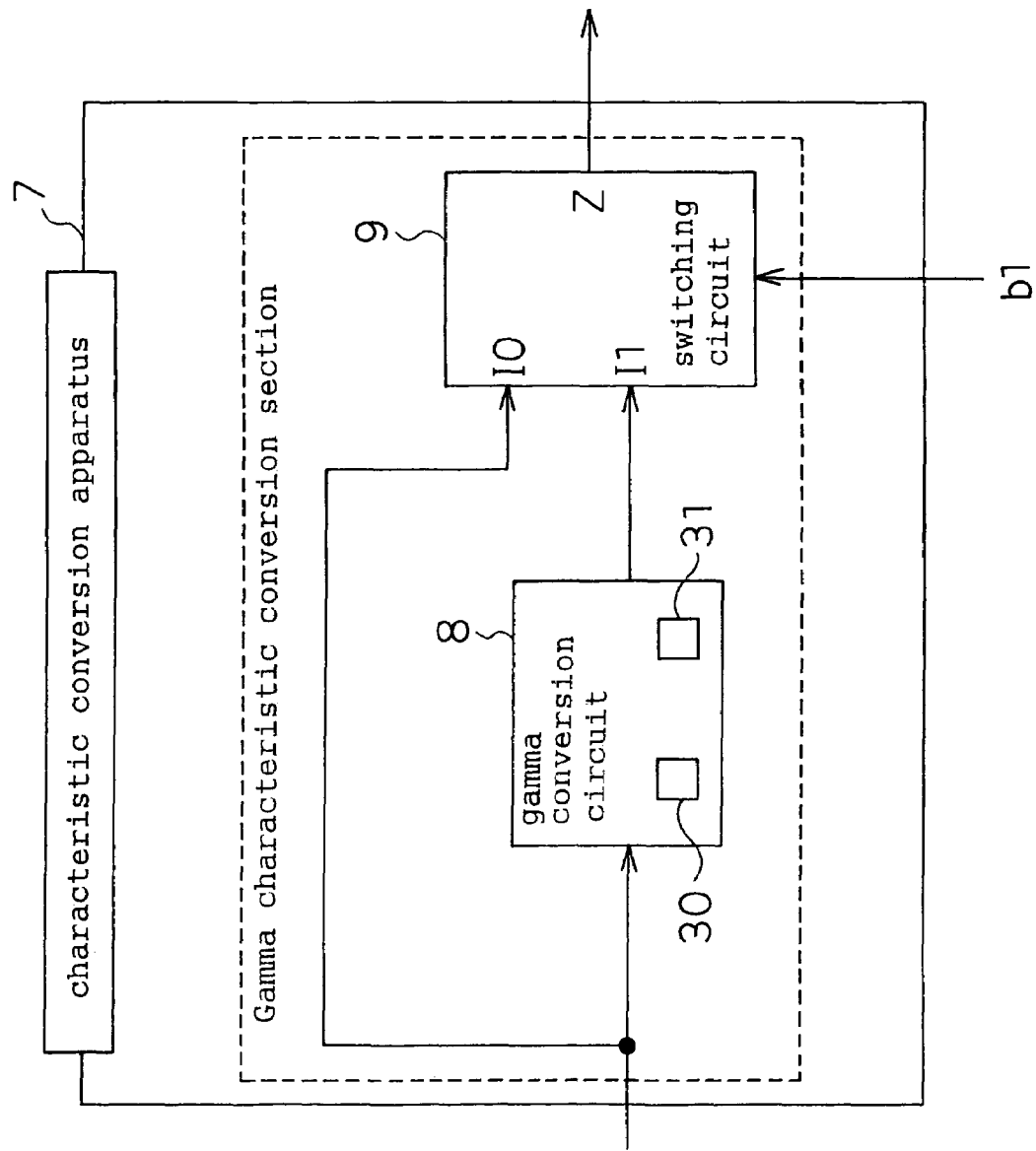
FIG. 5 is a block diagram showing an example of the inner configuration of a characteristic conversion apparatus 7 in accordance with Embodiment 2 of the present invention.

FIG. 5 is a block diagram showing an example of the inner configuration of the characteristic conversion apparatus 7; numeral 8 designates a gamma conversion circuit, and numeral 9 designates a switching circuit. The gamma conversion circuit 8 includes a storage section 30 and a correction section 31. Information of converting a gamma curve characteristic depending on the image pickup information signal a1 is stored in the storage section 30. The correction section 31 converts the gamma characteristic of an input signal by using the gamma curve characteristics stored in the storage section 30.

In the case of a mode wherein the image pickup apparatus 6 outputs a video signal as its image pickup signal S1, an input signal in which the images of various objects have been picked up is converted on the basis of the video signal gamma curve characteristic shown in FIG. 4, and output as a video signal from the image pickup apparatus 6. At this time, gamma information is output as the image pickup information signal a1 together with the image pickup signal S1 The gamma information obtained at this time includes information indicating that the image pickup apparatus 6 uses a gamma curve characteristic classified as the video signal gamma curve characteristic, among various gamma curve characteristics. Furthermore, in the case of a mode wherein the image pickup apparatus 6 outputs a film signal, an input signal in which images have been picked up is converted on the basis of the film signal gamma curve characteristics shown in FIG. 4, and the image pickup signal S1 is output as a film signal from the image pickup apparatus 6. At this time, gamma information is output as the image pickup information signal a1 together with the image pickup signal S1. The gamma information obtained at this time includes information indicating that the image pickup apparatus 6 uses a gamma curve characteristic classified as the film signal gamma curve characteristic, among various gamma curve characteristics.

In the reproduction apparatus 3, just as in the case of Embodiment 1, the record signal S2 is input, and the reproduction signal S3 serving as an example of the first image pickup signal of the present invention is output, and the gamma information extracted from the record signal S2 is output as the control signal b1 to the characteristic conversion apparatus 7. In the characteristic conversion apparatus 7, when the information included in the control signal b1 indicates a video signal gamma curve characteristic, the switching circuit 9 selects a passage wherein the reproduction signal S3 having been input is directly output without passing through the gamma conversion circuit 8; when the information included in the control signal b1 indicates a film signal gamma curve characteristic, the switching circuit 9 selects a passage wherein the reproduction signal S3 having been input is output through the gamma conversion circuit 8.

Figure 6A:
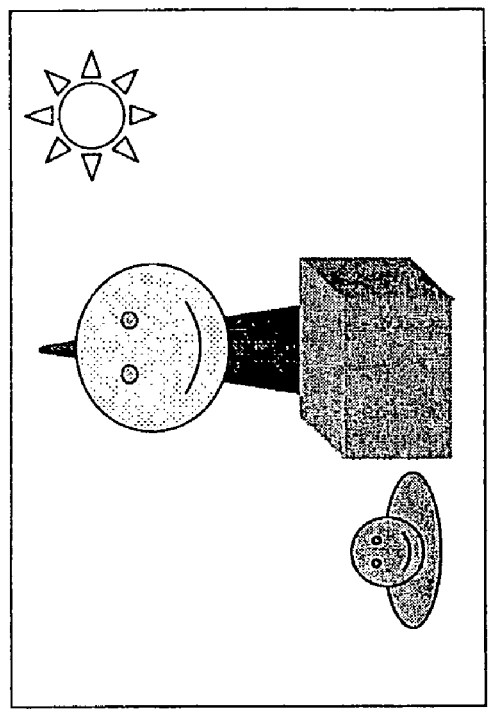
FIGS. 6(a) and 6(b) are display image views each showing an output example of an image on a display apparatus 5 in accordance with Embodiment 2 of the present invention.
Figure 6B:
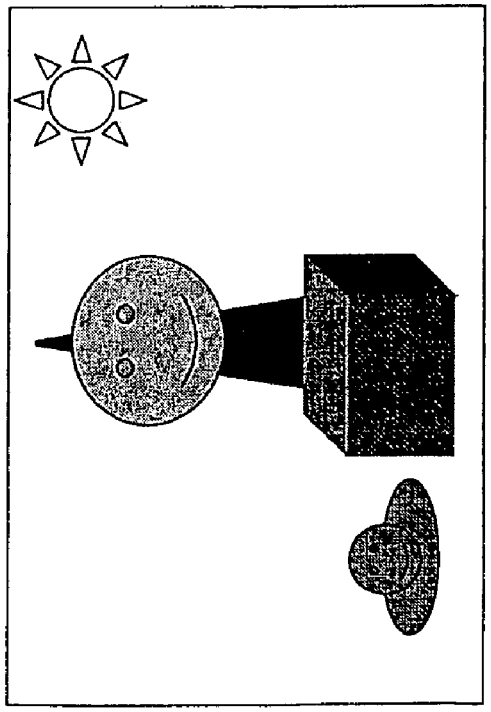

The gamma conversion circuit 8 has a conversion characteristic shown in FIG. 4, wherein the film signal gamma curve characteristic becomes nearly close to the video signal gamma curve characteristic. In other words, regardless of whether the reproduction signal S3 input to the characteristic conversion apparatus 7 is a video signal or a film signal, the characteristic conversion apparatus 7 directly outputs the reproduction signal S3 or converts and outputs the signal as a signal having the video signal gamma curve characteristic (that is, a video signal), that is, as the output signal S4 serving as an example of a second image pickup signal of the present invention, to the display apparatus 5. Regardless of whether the image pickup signal output from the image pickup apparatus 1 is a video signal or a film signal, the display apparatus 5 reproduces the image pickup signal having the gradation of the video signal. FIGS. 6(a) and 6(b) show examples of display screens on the display apparatus 5. FIG. 6(a) shows a display screen on the display apparatus 5 in the case when an image picked up in the film signal output mode is displayed without passing through the gamma conversion circuit 8. This screen is the same as the screen (FIG. 13(b)) in accordance with the conventional technology and shows an image with low contrast as a whole. On the other hand, in the case when the image pickup/reproduction system in accordance with this embodiment is used, even a signal obtained by image pickup in the film signal output mode is subjected to gamma conversion so as to have a characteristic similar to that of a signal used for image pickup as a video signal, whereby it is possible to obtain an image with high contrast as shown in FIG. 6(b).

As described above, in accordance with Embodiment 2, the image pickup apparatus 1 can be used for both video and film signals; in addition, an image with low contrast, which causes a problem at the time when a film signal is displayed in particular, is converted by gamma conversion so as to have a characteristic nearly equivalent to the video gamma characteristic, whereby the image can be displayed clearly on an ordinary video signal monitor and image confirmation is made easy. Furthermore, the image pickup/reproduction system can be used wholly for both video and film signals.

EMBODIMENT 3

Figure 7:
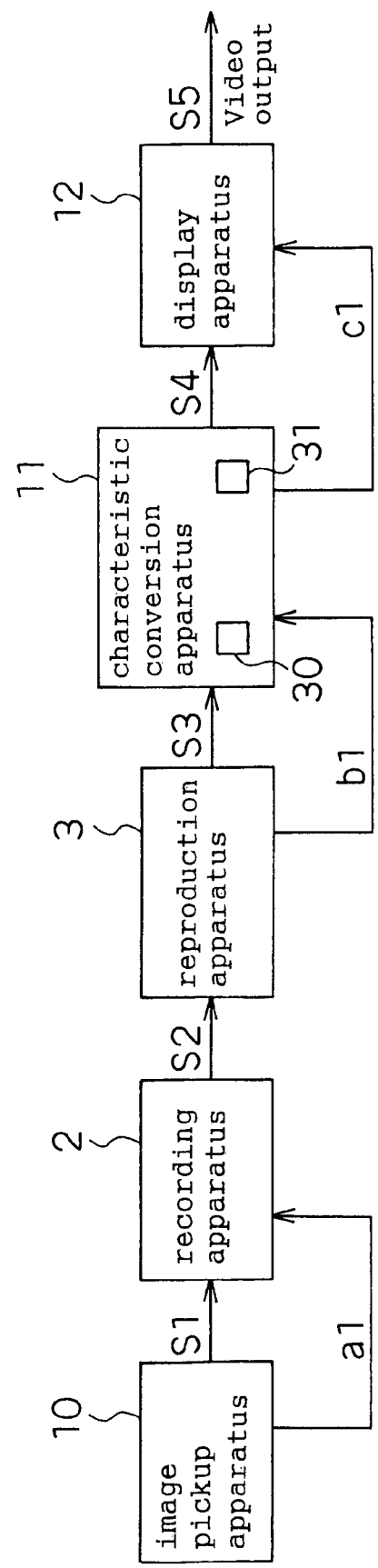
FIG. 7 is a block diagram showing the configuration of a film or video image pickup signal recording/reproduction system in accordance with Embodiment 3 of the present invention.

FIG. 7 is a block diagram showing the configuration of an image pickup/reproduction system in accordance with Embodiment 3 of the present invention. In FIG. 7, numeral 10 designates an image pickup apparatus of outputting an image pickup signal available in various kinds, numeral 2 designates a recording apparatus of recording the output signal of the image pickup apparatus 10, numeral 3 designates a reproduction apparatus of reproducing the output signal of the recording apparatus 2, numeral 11 designates a characteristic conversion apparatus of converting the characteristic of the output signal of the reproduction apparatus 3, and numeral 12 designates a display apparatus of displaying the output signal of the characteristic conversion apparatus 11. The configuration in accordance with Embodiment 3 greatly differs from those in accordance with Embodiments 1 and 2 in that the display apparatus 12 displays gamma data; the other apparatuses serving as the components of the configuration are the same and their operations are similar.

The operation of the image pickup/reproduction system in accordance with Embodiment 3 configured as described above will be described below by using FIGS. 8, 9 and 10.

Figure 8:
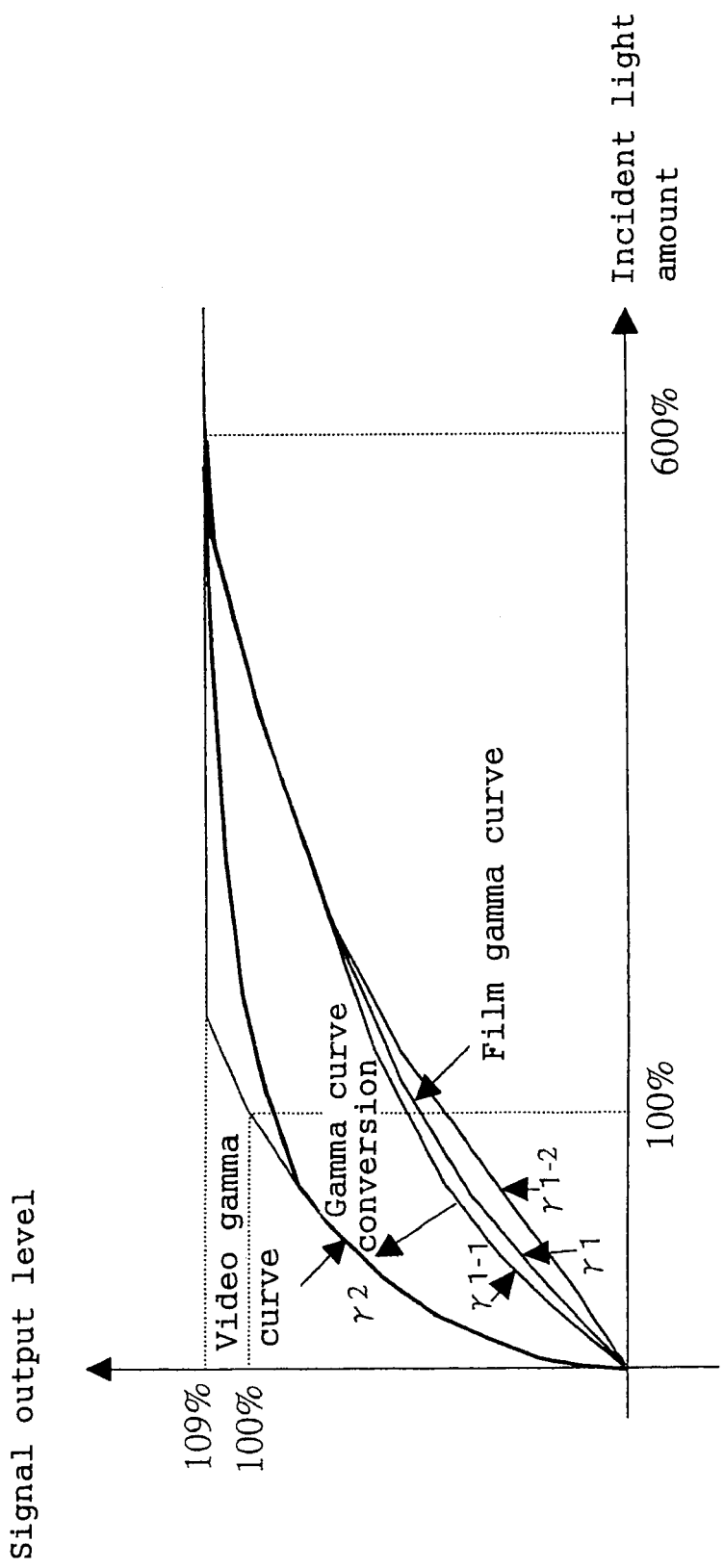
FIG. 8 is a characteristic diagram showing examples of plural kinds of film gamma curve characteristics provided in an image pickup apparatus 10 in accordance with Embodiment 3 of the present invention.
Figure 9:
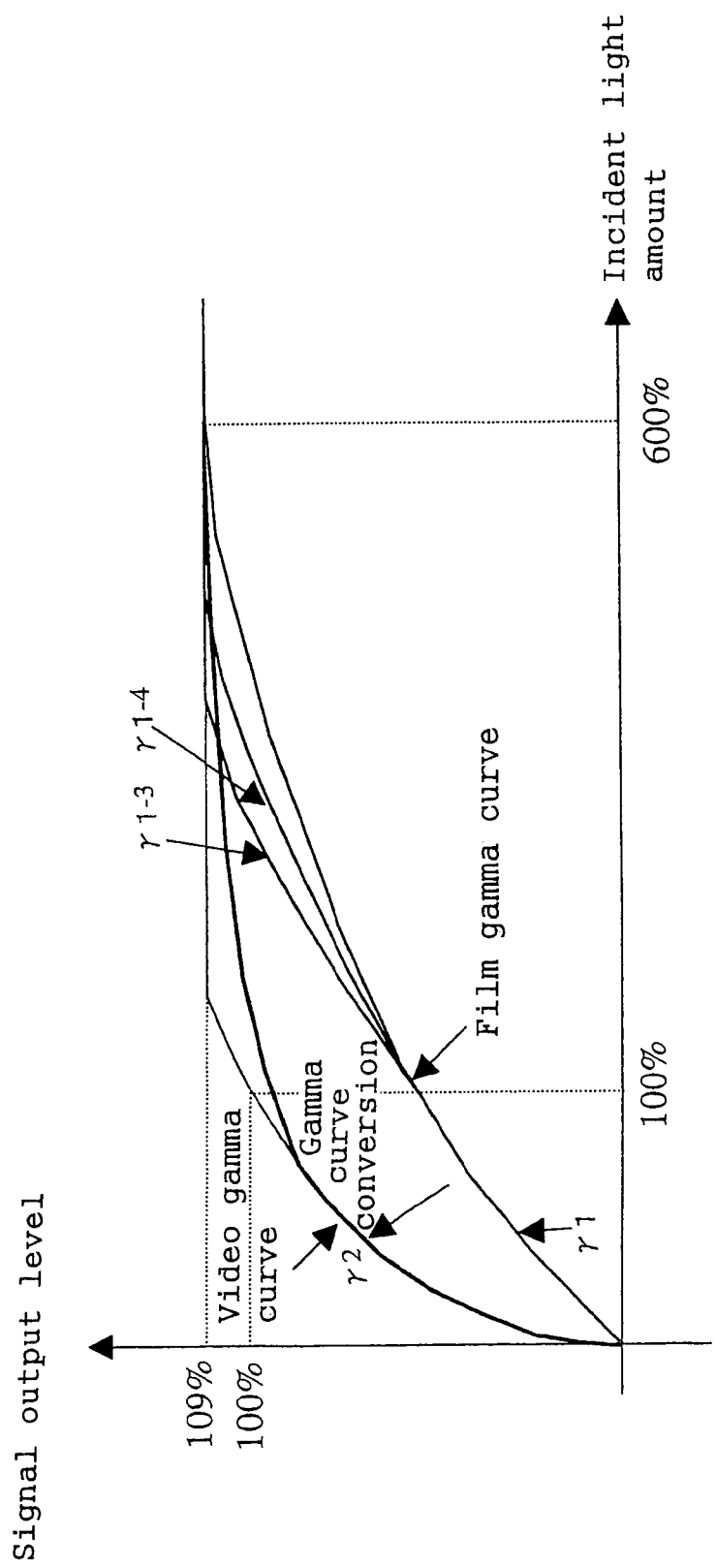
FIG. 9 is a characteristic diagram showing examples of plural kinds of film gamma curve characteristics provided in the image pickup apparatus 10 in accordance with Embodiment 3 of the present invention.

FIGS. 8 and 9 show examples of plural kinds of film signal gamma curve characteristics; FIG. 8 shows characteristics γ 1-1, γ 1-2, etc. obtained by changing the whole tone on the basis of the film gamma curve characteristic γ 1 generally serving as a fundamental, and FIG. 9 shows characteristics γ 1-3, γ 1-4, etc. obtained by changing the reproduction range of the high-luminance section from the fundamental characteristic γ 1. By this change of the characteristic, when data obtained by image pickup and recording is finally converted into a film, the reproduction characteristics of gradation and color shade change delicately. In the case of image pickup in the film signal mode, the image pickup characteristics (the gamma curve characteristic and the like) are changed frequently at each scene or cut according to its artistry, and processing and handling are carried out depending on the characteristics while the image is confirmed even during editing and film recording. Hence, the gamma curve characteristic data of each image pickup scene or cut becomes very important information for editing and film recording for work production.

Figure 10C:
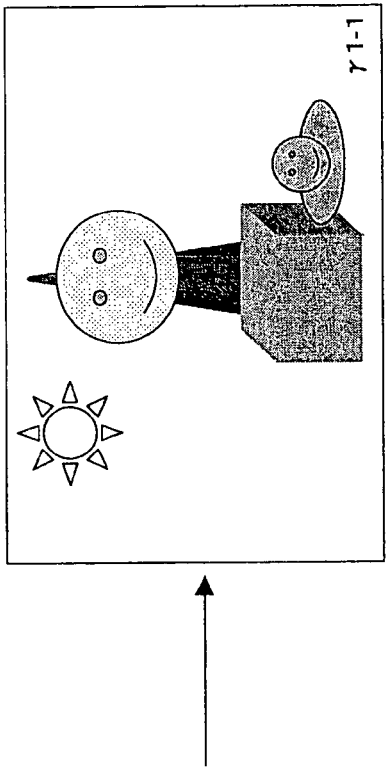
FIGS. 10(a1), 10(a2). 10(b) and 10(c) are display image views each showing an output example of an image on a display apparatus 12 in accordance with Embodiment 3 of the present invention.
Figure 10B:
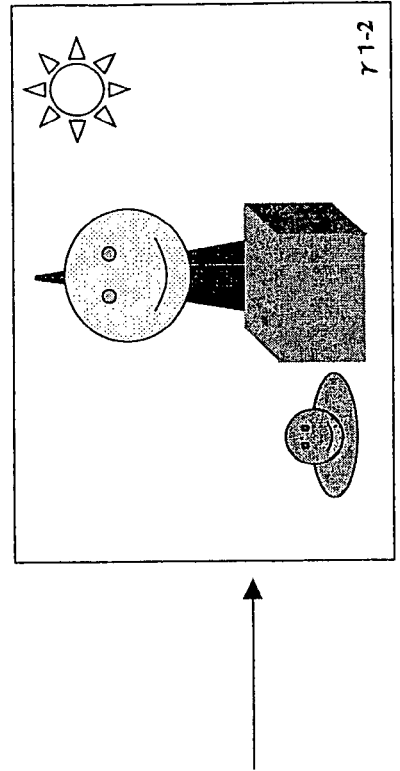
Figure 10:
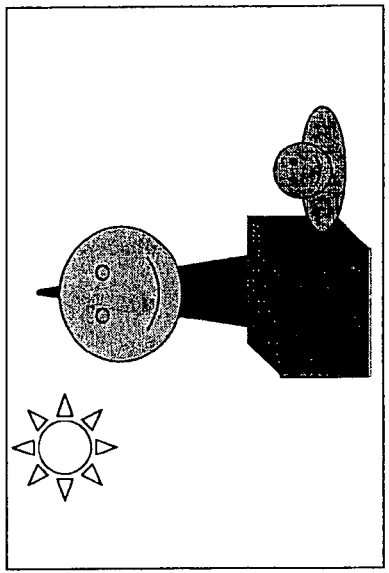
Figure 10:
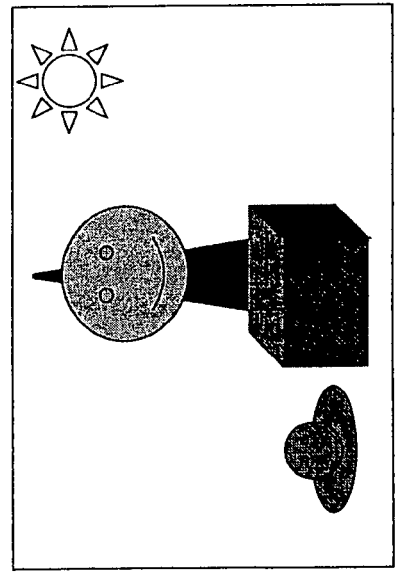

With the image pickup/reproduction system in accordance with this embodiment, this gamma curve characteristic data (c1 in FIG. 7) is output from the characteristic conversion apparatus 11 to the display apparatus 12 at the timing suited for each output image, and the data is displayed on the display apparatus 12. FIG. 10 shows display examples of this case. FIG. 10(a1) shows a display in the case when a signal used for image pickup at the film signal gamma curve characteristic γ 1-1 is not subjected to gamma conversion by the characteristic conversion apparatus 11 and FIG. 10(a2) shows a display in the case when a signal used for image pickup at the film signal gamma curve characteristic γ 1-2 is not subjected to gamma conversion by the characteristic conversion apparatus 11. In Embodiment 3, just as in the case of Embodiment 2, these image pickup signals are subjected to gamma conversion by the characteristic conversion apparatus 11, whereby they are subjected to gamma conversion so as to have characteristics similar to those obtained by image pickup in the video signal mode; hence, it is possible to obtain images with high contrast as shown in FIG. 10(c) and 10(d). Furthermore, letters indicating the gamma curve characteristics used at the time of image pickup by the image pickup apparatus 10 are simultaneously displayed on the screen of the display apparatus 12.

As described above, in accordance with Embodiment 3, an image with low contrast, which causes a problem at the time when a film signal is displayed in particular, is converted-by gamma conversion so as to have a characteristic nearly equivalent to the video signal gamma characteristic, whereby the image can be displayed on an ordinary video monitor and displayed and confirmed excellently, information indicating the gamma curve characteristic used at the time of image pickup can be confirmed simultaneously, and very important information during film editing and processing can be obtained.

Figure 15:
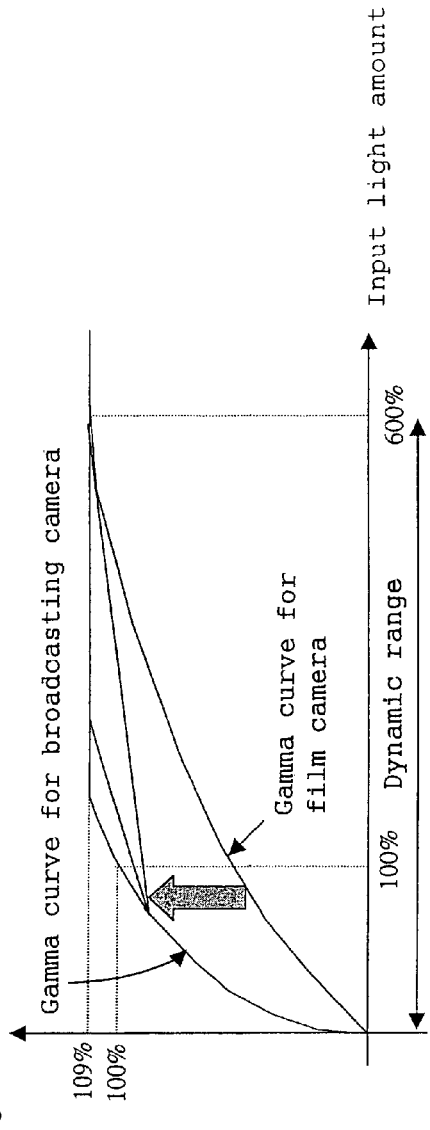
FIG. 15 is a view showing the direction of change from the film γ characteristic to the video γ characteristic of the image pickup apparatus in accordance with the present invention.

In the video signal gamma curve characteristic shown in FIG. 4, the level of the output signal at an input light amount of 100% corresponds to 100 IRE. In a range having an input light amount of more than 100%, the inclination of the video signal gamma curve gradually becomes close to 0. In addition, in a range wherein the level of the output signal is more than 100 IRE, the inclination of the graph is decreased in the range of up to an input light amount of about 600% by the so-called knee processing as shown in FIG. 15, and the change of the signal output level with respect to the input light amount is compressed in some cases. However, in any case, when it is assumed that bits are allocated uniformly in the range of the output signal level of 0 to 109 IRE, the change amount of the output signal decreases relatively in the range of the output signal level of more than 100 IRE even if the dynamic range of the input light amount is large. In other words, even if light having a light amount more than five times the light amount at the time when a video signal is used for image pickup is input, resolution is hardly reproduced, the gradation at white portions becomes flat (the so-called white saturation), whereby gradation is hardly reproduced.

In order that such a problem is solved, the number of bits allocated in the range of the output signal level of more than 100 IRE or in the range exceeding the knee point shown in FIG. 15 is made larger than that of bits allocated in other ranges. In other words, even if the input light amount changes in the range of the input light amount of more than 100%, the number of bits to be allocated should only be increased to the extent that the change is reflected by the output signal.

Or, even if bits are allocated uniformly in the output signal level ranging from 0 to 109 REI, the problem can be solved by making the number of bits to be processed by the recording apparatus 2 and the following apparatuses or the recording/reproduction apparatus 42 and the following apparatuses not less than the number of bits to be processed by the image pickup apparatus 1, 6 or 41. In particular, it is preferable that the number of bits to be processed by the characteristic conversion apparatus 7 or 11 or the gamma characteristic correction apparatus 43 should be made larger than the number of bits to be processed by the image pickup apparatus 1, 6 or 41.

It is needless to say that the letter information may be mixed with an image beforehand by the characteristic conversion apparatus after detected by the reproduction apparatus 3, instead of being directly input to the display apparatus 12.

Furthermore, although only the film gamma characteristic has been explained in Embodiment 3, even when the video gamma characteristic is changed variously in a similar way for image formation, it is needless to say that the gamma value can be displayed and that a similar effect can be obtained.

EMBODIMENT 4

Figure 14:
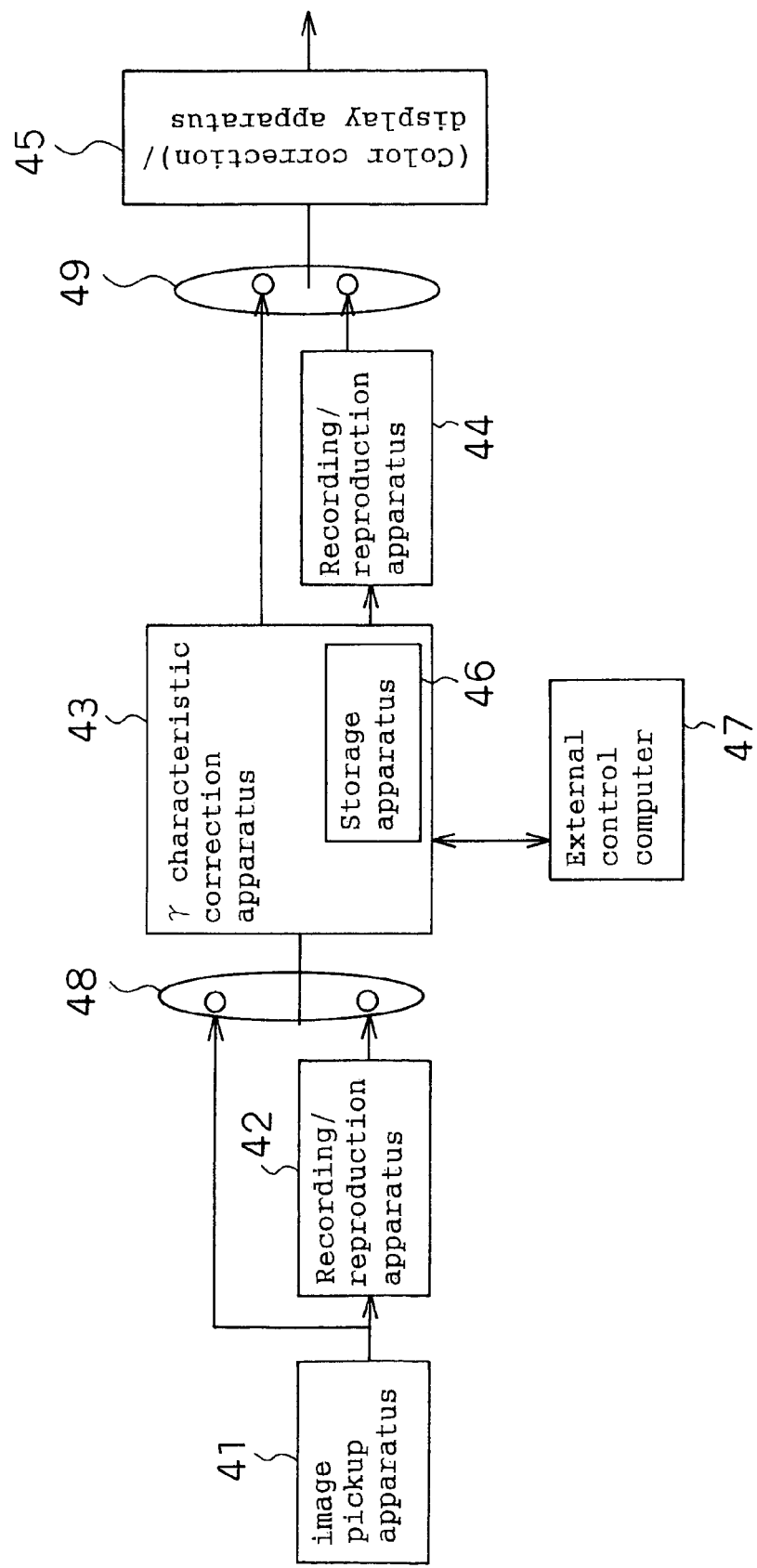
FIG. 14 is a view showing a configuration of an image pickup/reproduction system in accordance with Embodiment 4 of the present invention.

FIG. 14 is a system configuration diagram showing Embodiment 4 of the present invention. This embodiment is a modification example of Embodiment 2. Numeral 41 designates an image pickup apparatus, numeral 42 designates a recording/reproduction apparatus, numeral 43 designates a gamma characteristic correction apparatus serving as an example of the characteristic correction apparatus in accordance with the present invention, numeral 44 designates a second recording/reproduction apparatus, numeral 45 designates a (color correction)/display apparatus, numeral 46 designates a storage apparatus, numeral 47 designates an external control computer, and numerals 48 and 49 are input passage selection apparatuses.

In FIG. 14, the image pickup apparatus 41 is the so-called television camera or video camera and outputs a signal (film signal) with a gamma characteristic having a dynamic range wider than the conventional range for film production set for ordinary movie photography. This film signal, that is, the output of the image pickup apparatus 41, is fed to the gamma characteristic correction apparatus 43 via the recording/reproduction apparatus 42 or directly. After an input signal is selected by using the input passage selection apparatus 48, the input passage selection apparatus 48 converts the film signal to a video signal having various variations and carries out correction, and has a storage apparatus 46 capable of storing a correction value for each kind of output display. In addition, it can be connected to an external control computer 47 serving as an external control apparatus, whereby verification by experiment for determining the optimum gamma characteristic correction value for each display or for determining the gamma for providing a special effect can easily be carried out, whereby the correction value being different depending on the individual variation of the display apparatus 45 can easily be narrowed down. The gamma characteristic correction apparatus 43 processes the signal selected by the input passage selection apparatus 48 by using the number of bits not less than the number of processed bits of the image pickup apparatus 41 in ordinary cases other than cases aimed for special effects. The details of the gamma characteristic correction apparatus 43 are shown in FIG. 17.

Figure 17:
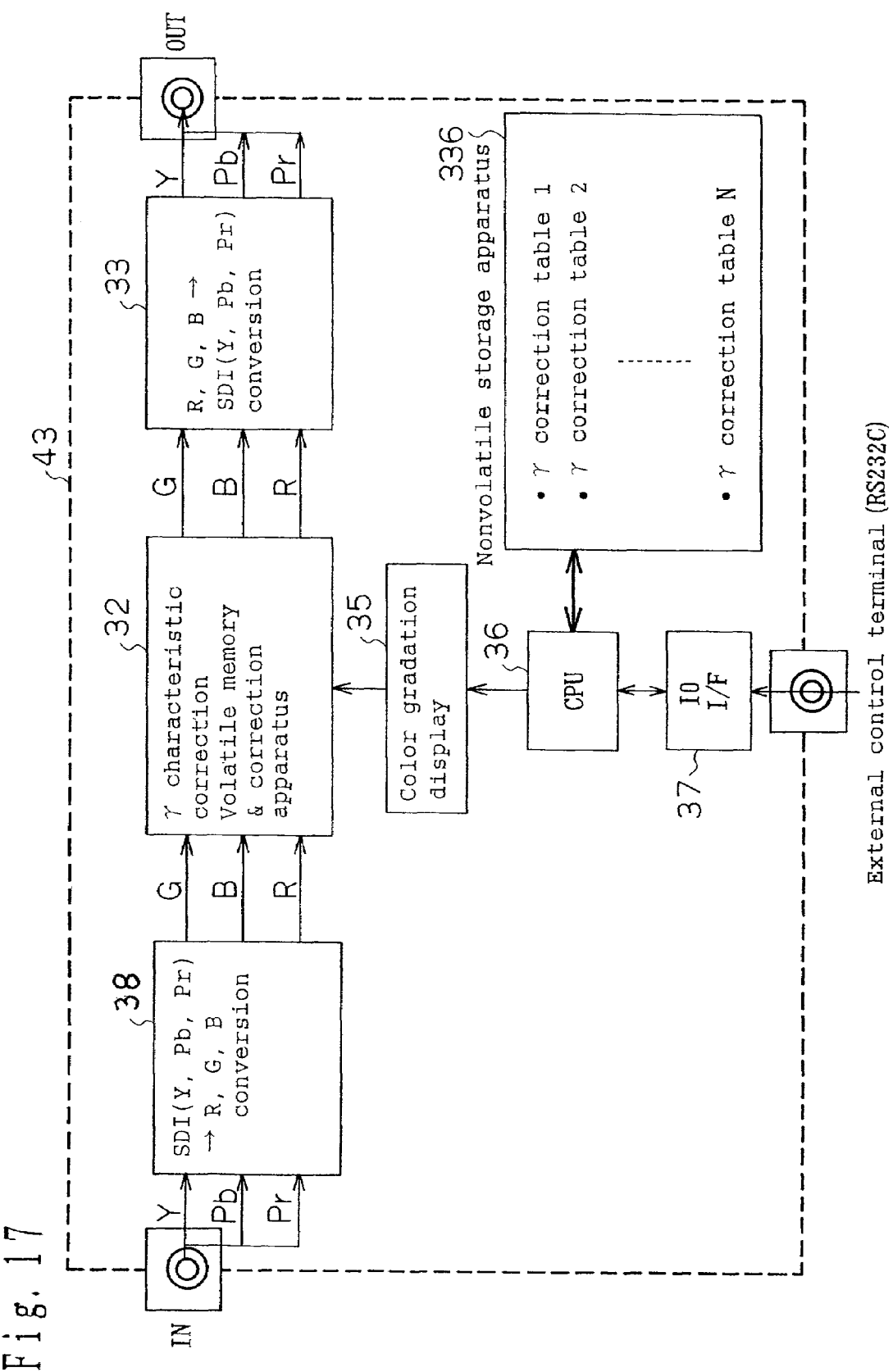
FIG. 17 is a view showing an example of the γ characteristic correction apparatus in accordance with the present invention.

In FIG. 17, numeral 31 designates a conversion apparatus for making conversion from SDI (Serial Digital Interface) (Y, Pb, Pr) to R, G, B, numeral 32 designates a correction apparatus, for gamma characteristic correction, equipped with volatile memory, numeral 33 designates a conversion apparatus for making conversion from R, G, B to SDI (Y, Pb, Pr), numeral 35 designates a gradation display apparatus for the respective colors of R, G, B, numeral 36 designates a CPU, numeral 336 designates a nonvolatile storing apparatus, and numeral 37 designates an external control terminal IO I/F (in this case, RS232C; however, IEEE1394 and USB can also be used as a matter of course).

In FIG. 17, usually, an input signal is fed in the form of R, G, B or Y, Pb, Pr; however, since SDI is frequently used, the case of Y, Pb, Pr is described in this example.

This signal is converted into R, G, B by the R, G, B conversion apparatus 38.

However, in the case when input and output are carried out in accordance with RGB, the conversion apparatus 38 and the conversion apparatus 33 are not necessary.

The output signals R, G, B of the conversion apparatus 38 are subjected to gamma characteristic correction by the gamma characteristic correction apparatus 32. The correction information is stored in the nonvolatile storage apparatus 336 so that a plurality of gamma correction tables correspond to respective image pickup information signals a1, one to one, and one of the tables is extracted by the CPU 36 depending on the image pickup information signal a1. In addition, in the color gradation correction apparatus 35, conversion into correction information for each color gradation is carried out, and in the gamma characteristic correction apparatus 32, gamma characteristic correction processing is carried out for each of R, G, B. Since volatile memory is used in the example shown in FIG. 17, the contents of the memory are reset when the power source is turned off. It is possible as a matter of course to store the last setting by using nonvolatile memory for this section. The output of the gamma characteristic correction apparatus 32 is converted into SDI (Y, Pb, Pr) by the conversion apparatus 33 and fed to the latter stage. The external control terminal I0 I/F 37 is connected to the external control computer 47, and information obtained from the external control computer 47 is stored in the nonvolatile storage apparatus 336.

Since the gamma characteristic correction tables are required to be optimum tables in consideration of the influences of variations and special effects of the display apparatuses 5, 12 and 45, experiments of confirming the influences have been carried out, and optimum correction tables have been prepared efficiently.

Figure 18:
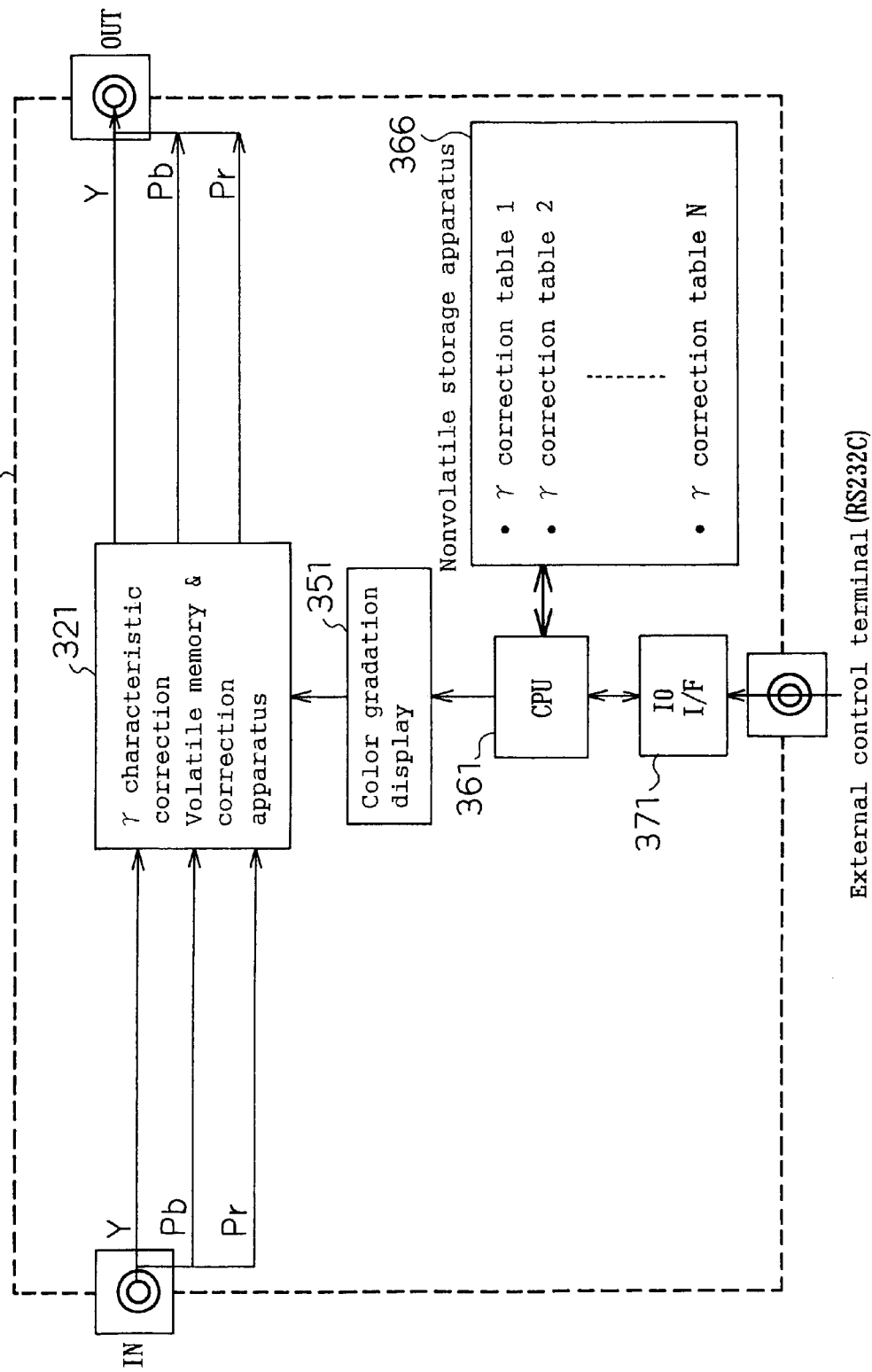
FIG. 18 is a view showing an example of the γ characteristic correction apparatus in accordance with the present invention.

Another example of the configuration of the gamma characteristic correction apparatus 43 is shown in FIG. 18. This differs from the example shown in FIG. 17 in that the Y, Pb, Pr signals are processed directly. Even when a simplified method wherein only the Y signal of Y, Pb, Pr is subjected to gamma correction is used as an expansion of this example, an effect can be obtained.

In the image pickup/reproduction system shown in FIG. 14, in one case, the output of the gamma characteristic correction apparatus 43 is directly reproduced by the (color correction)/display apparatus 45, and in the other case, its state is recorded by the recording/reproduction apparatus 44 and subjected to color correction for video on the output side of the gamma characteristic correction apparatus 43. In this way, the signal output from the gamma characteristic correction apparatus 43 or the signal passing through the output passage of the recording/reproduction apparatus 44 is selected as the signal subjected to color correction by the input passage selection apparatuses 49, and the signal is fed to the (color correction)/display apparatus 45, and its image is reproduced. In addition, a case wherein the signal output from the recording/reproduction apparatus 44 is subjected to color correction by the (color correction)/display apparatus 45 is also possible as a matter of course. As the (color correction)/display apparatus, an apparatus for DLP cinema and the like is used, and the selection signal of the input passage selection apparatuses 49 is subjected to color correction in either of the passages and then used for broadcasting.

Figure 19:
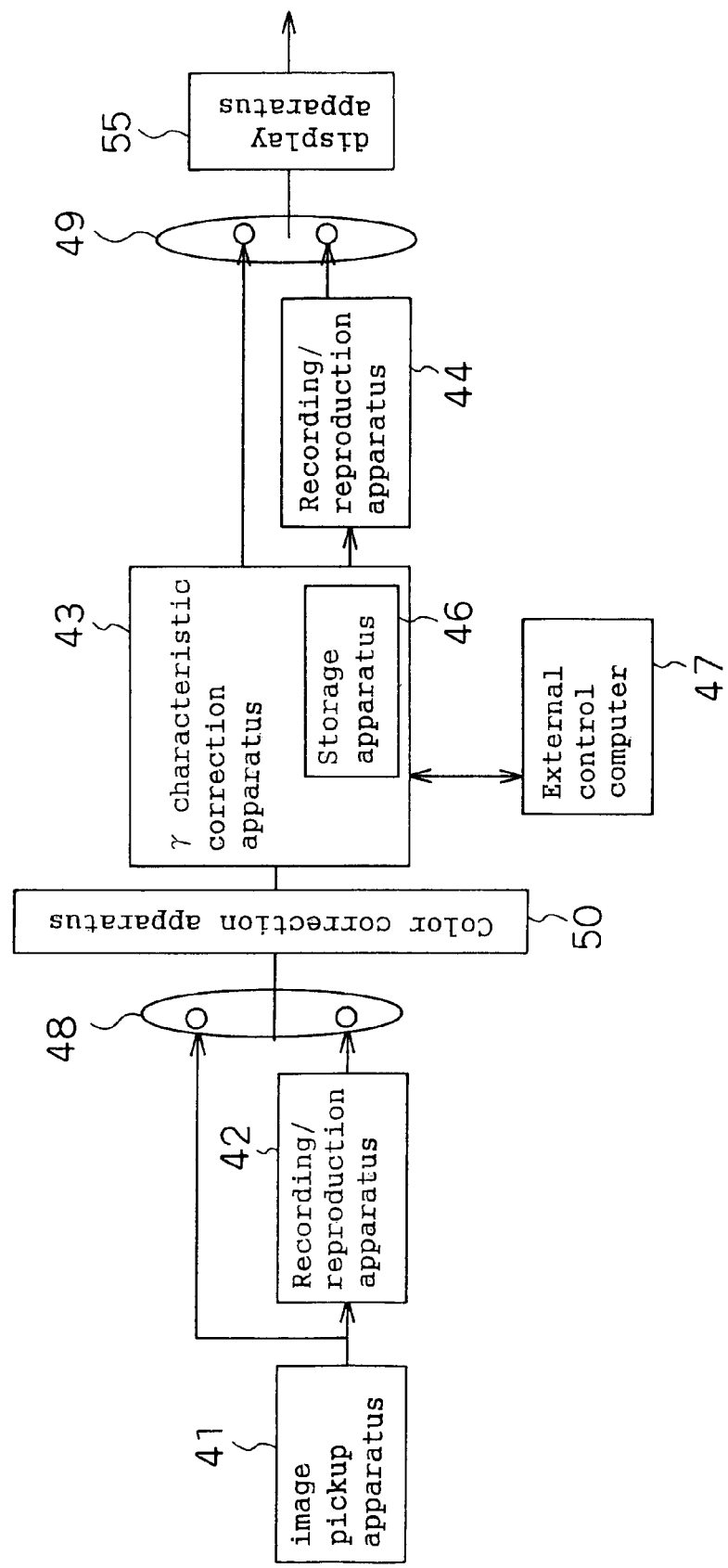
FIG. 19 is a view showing another configuration of the image pickup/reproduction system in accordance with Embodiment 4 of the present invention.

Furthermore, on the basis of the signal output from the recording/reproduction apparatus 44, color correction may be carried out by a color correction apparatus 50 on the input side of the gamma characteristic correction apparatus 43 having a wide dynamic range (see FIG. 19). Since color change occurs depending on level, color correction is generally difficult if not carried out after gamma correction; however, with the image pickup/reproduction system in accordance with this embodiment, color correction can be carried out while an image with high contrast is confirmed, whereby it is possible to carry out color correction for the signal on the input side of the gamma characteristic correction apparatus having a wide dynamic range. As a result, color correction having higher accuracy can be carried out.

In addition, the gamma characteristic correction apparatus 43 may be incorporated in the image pickup apparatus 41, the recording/reproduction apparatus 42 or 44 or the (color correction)/display apparatus 45, and in that case, the configuration of the system becomes simple.

Furthermore, the contents to be stored in the nonvolatile storage apparatus 336 may be mathematical expressions instead of tables. In that case, the storage capacity of the nonvolatile storage apparatus 336 can be made smaller.

Figure 16:
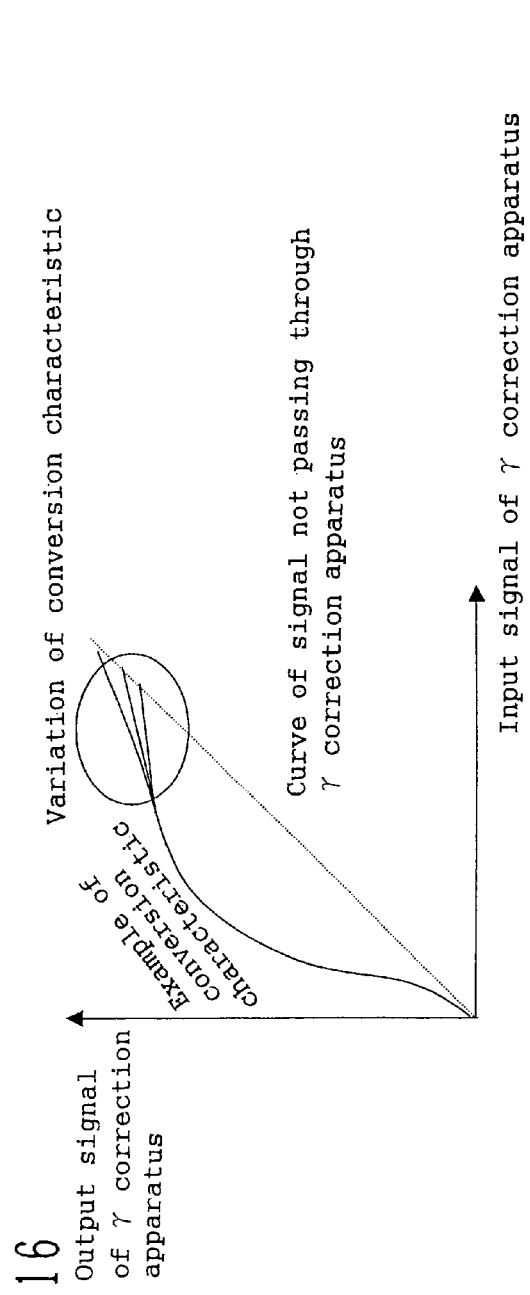
FIG. 16 is a characteristic view showing the input/output characteristic of the γ characteristic correction apparatus in accordance with the present invention.

The recommended correction characteristic of the gamma characteristic correction apparatus 43 is as described below; as shown in FIG. 16, in the case when the (color correction)/display apparatus 45 is a CRT display, the inclination of the correction value for the output value of the gamma characteristic correction apparatus 43 is 2 to 2.5 and tends to increase gradually in the range of 0 to 70 IRE, the increase of the inclination attenuates gradually in the range of 70 IRE or more, and the inclination becomes close to 1 at 109 IRE. In FIG. 16, the state at the time when no correction value is added to the input/output characteristic of the gamma characteristic correction apparatus 43 is represented by a straight line having an inclination of 1 (45 degrees), and the change at the time when correction is added is represented as an example of a conversion characteristic.

As shown in FIG. 16, the inclination of the gamma curve characteristic in the case when a film signal is subjected to gamma conversion is about two times the inclination in the case when the film signal is not subjected to gamma conversion. More specifically, a curve is obtained in which the inclination is 2 to 2.6 times that of the straight line when the output of the gamma characteristic correction apparatus 43 is in the range of up to about 70 IRE, the inclination gradually decreases in the range of more than 70 IRE, and the inclination returns to 1 at about 109 IRE. The optimum value of the difference in the inclination changes depending on at which portion the knee point of the gamma curve characteristic is set or the setting of the center value (usually 0.45, reciprocal of 2.2 in the case of a CRT, and variable from 0.3 to 0.65) of the master γ. In addition, since the knee point can also be in the range of 40 IRE or more, the inclination of the correction value changes from 1 to about 3.8.

Furthermore, in all the embodiments, the image pickup state is detected by the reproduction apparatus, and the characteristic of the characteristic correction apparatus is switched depending on the state; however, it is needless to say that the detection may be omitted and the switching may be carried out manually.

Still further, in all the embodiments, it is needless to say that the characteristic correction apparatus may carry out characteristic correction suited for respective cases of video and film signals depending on the gamma characteristics of respective display apparatuses, such as plasma and liquid crystal display panels, other than CRT display apparatuses.

Still further, in all the embodiments, it is needless to say that the characteristic correction apparatus may be incorporated in each reproduction apparatus or each display apparatus.

Still further, in all the embodiments, it is needless to say that each of the image pickup apparatus, the recording apparatus and the reproduction apparatus may be integrated as typified by a camera recorder and the like.

Still further, in the present invention, the above-mentioned image pickup apparatus may have a plurality of gamma curves capable of being classified into two kinds: a plurality of gamma curves γ 1-1, γ 1-2, γ 1-3, ..., serving as ordinary video gamma curves, and a plurality of gamma curves γ 2-1, γ 2-2, γ 2-3, ..., serving as film gamma curves, and information of identifying the plurality of gamma curves may be used as gamma information. In that case, the characteristic conversion apparatus 7 may convert the gamma curve characteristic of the reproduction signal S3 so that when input gamma information is a kind of γ 1, its as-is state is obtained, and so that when input gamma information is a kind of γ 2, a characteristic similar to that of a kind of γ 1 is obtained. Even in that case, an effect similar to that described above can be obtained.

In the descriptions of Embodiments 2 to 4, the gamma characteristic of the reproduction signal S3 is explained by taking an example wherein a film signal gamma curve characteristic is converted into a video signal gamma curve characteristic; however, the conversion may be carried out from a film gamma curve characteristic into a characteristic between the film gamma curve characteristic and the video signal gamma curve characteristic. In this case, as an example, a characteristic wherein the level of the flesh color of a face (corresponding to an input light amount of 30 to 40%) is converted into an output signal level of 60 to 70 IRE is preferable. In addition, a characteristic wherein an input light amount of 50 to 60% is converted into about 80 IRE or more is also preferable. Even in that case, the contrast rises, whereby an effect similar to that described above can be obtained.

Still further, in the above-mentioned descriptions, it is assumed that the output from each reproduction apparatus is input to each characteristic conversion apparatus; however, even the output from each recording apparatus or the output from each image pickup apparatus may be input. In other words, the first image pickup signal of the present invention may be the record signal S2 or the image pickup signal S1.

Still further, the program of the present invention is a program that carries out the functions of all or part of the means (or apparatuses, devices, etc.) of the above-mentioned characteristic correction apparatus of the present invention by using a computer and operates in cooperation with the computer.

Still further, the recording medium of the present invention is a recording medium having a program that carries out all or part of the functions of all or part of the means (or apparatuses, devices, etc.) of the above-mentioned characteristic correction apparatus of the present invention by using a computer, the medium is readable by the computer, and the above-mentioned program having been read is used to carry out the above-mentioned functions in cooperation with the above-mentioned computer.

The above-mentioned "part of the means (or apparatuses, devices, etc.)" of the present invention is one or several means in the plural means thereof, and the above-mentioned "part of the steps (or processes, operations, actions, etc.)" of the present invention is one or several steps in the plural steps thereof.

Still further, the above-mentioned "the functions of the means (or apparatuses, devices, etc.)" of the present invention are all or part of the functions of the above-mentioned means, and the above-mentioned "the operations of the steps (or processes, operations, actions, etc.)" of the present invention are all or part of the above-mentioned steps.

Still further, one utilization form of the program of the present invention may be an embodiment that is recorded on a recording medium readable by a computer and operates in cooperation with the computer.

Still further, another utilization form of the program of the present invention may be an embodiment that is transmitted through a transmission medium, is read by a computer and operates in cooperation with the computer.

Still further, the data structure of the present invention includes database, data format, data table, data list, data type, etc.

Still further, the recording medium includes ROM and the like, and the transmission medium includes a transmission medium, such as the Internet, light, electric wave, sound wave, etc.

Still further, the above-mentioned computer of the present invention is not limited to pure hardware, such as a CPU, but may include firmware, OS and peripheral devices.

Still further, as described above, the configuration of the present invention may be attained by software or by hardware.

As described above, in accordance with the present invention, output is possible while characteristic switching is carried out depending on the information of the state of image pickup, images can be displayed or confirmed in a relatively optimum state regardless of any image pickup state, and a film or video image pickup signal recording/reproduction system having high image quality and high performance can be constructed.

Still further, in accordance with the present invention, in addition to the above-mentioned effects, the image pickup apparatus can be used for both video and film signals, an image with low contrast, which causes a problem at the time when a film image pickup signal is displayed in particular, can be displayed on an ordinary video monitor by converting its characteristic into a characteristic close to the video gamma curve characteristic by using the gamma conversion, whereby excellent display and confirmation are made possible. Hence, the whole system can be used for both video and film signals, the so-called digital cinema system can be constructed by using a currently available digital video system, and a film image pickup signal recording/reproduction system can be provided at low cost.

Still further, in accordance with the present invention, in addition to the above-mentioned effects, information indicating the gamma characteristic at the time of image pickup can also be confirmed simultaneously, and very important information for not only video editing and processing but also for film editing and processing in particular can be obtained, whereby it is possible to provide a film or video image pickup signal recording/reproduction system being efficient and best suited for editing and image production.

The present invention can provide a characteristic conversion apparatus, an image pickup/reproduction system, a characteristic correction method, a program therefor and a recording medium, capable of providing an image easily confirmable on a monitor even in the case when an image pickup apparatus outputs a film signal.

The invention claimed is:

1. A characteristic correction apparatus for correcting gamma characteristics of image pickup signals provided by an image pickup apparatus comprising:
said image pickup apparatus producing image information signals to indicate that said image pickup signal is a first of the image pickup signals having a film gamma characteristic, and to indicate that said image pickup signal is a second of the image pickup signals having a video gamma characteristic, a storage section in which correction information of correcting said first of the image pickup signals into said second image pickup signal is stored, a correction section of correcting a gamma characteristic of said image pickup signal input in the case that said image information signal indicate that said image pickup signal input is said first of the image pickup signals by using said correction information.

2. A characteristic correction apparatus in accordance with claim 1, wherein said gamma characteristic is a gamma characteristic that determines the relationship between an incident light amount and an output signal in an image pickup apparatus.

3. A characteristic correction apparatus in accordance with claim 1, wherein
said video gamma characteristic is a gamma characteristic depending on which a signal larger than an output signal obtained from said film gamma characteristic is obtained at any given incident light amount used during image pickup.

4. A characteristic correction apparatus in accordance with claim 3, wherein
of said video gamma characteristic, the number of bits allocated for said signal output in the range of more than a predetermined value is larger than the number of bits allocated for said signal output in the range of said predetermined value or less, and
said predetermined value is a value at which 100% signal output is obtained according to the signal output value at the knee point of said video gamma characteristic or the ITU-R BT709 Standard.

5. A characteristic correction apparatus in accordance with claim 3, wherein said video gamma characteristic is obtained when a signal having a level of 50 to 60% of that of said first of the image pickup signals is corrected to a signal having a level of substantially 80% or more in the ITU-R BT709 Standard.

6. A characteristic correction apparatus in accordance with claim 3, wherein said video gamma characteristic is obtained when a signal having a level of 30 to 40% of that of said first image of the pickup signals is corrected to a signal having a level of 60 to 70% in the ITU-R BT709 Standard.

7. A characteristic correction apparatus in accordance with claim 3, wherein
said correction information includes information of correcting said first image pickup signal to said second image pickup signal having a plurality of gamma characteristics different in characteristics, and
said second image pickup signal is obtained on the basis of one of said plurality of gamma characteristics depending on the kind of said first image pickup signal.

8. A characteristic correction apparatus in accordance with claim 3, wherein said correction is carried out for at least one of (1) R, G, B, (2) Y, Pb, Pr and (3) only Y of Y, Pb, Pr.

9. A characteristic correction apparatus in accordance with claim 1, wherein said correction information is a table or a mathematical expression of carrying out correction by one-to-one correspondence between said first of the image pickup signals and said second of the image pickup signals.

10. A characteristic correction apparatus in accordance with claim 1, wherein said first image pickup signal is corrected to said second image pickup signal and then output or said first image pickup signal is directly output, depending on the kind of said first image pickup signal.

11. A characteristic correction apparatus in accordance with claim 1, wherein information regarding said first image pickup signal is output together with said second image pickup signal depending on the kind of said first image pickup signal.

12. An image pickup/reproduction system comprising:
a characteristic correction apparatus in accordance with claim 1,
said image pickup apparatus of generating said image pickup signals and said image information signal input to said characteristic correction apparatus, and
a display apparatus of displaying said image pickup signal corrected by said correction section of said characteristic correction apparatus.

13. An image pickup/reproduction system in accordance with claim 12, further comprising:
a color correction apparatus of color-correcting the image pickup signal, wherein
said color correction apparatus color-corrects said first of the image pickup signals outputted from said image pickup apparatus to input to said characteristic correction apparatus.

14. A characteristic correction method for correcting gamma characteristics of image pickup signals comprising the steps of:
producing image information signals to indicate that said image pickup signal is a first of the image pickup signals having a film gamma characteristic, and to indicate that said image pickup signal is a second of the image pickup signals having a video gamma characteristic;
storing correction information of correcting said first of the image pickup signals into said second image pickup signal in a storage section;
correcting a gamma characteristic of said image pickup signal input in the case that said image information signal indicate that said image pickup signal input is said first of the image pickup signals by using the correction information.

15. A physical computer readable medium for storing a program that operates a computer as a correction section of said characteristic correction apparatus in accordance with claim 1 of correcting a gamma characteristic of said image pickup signal input in the case that said image information signal indicate that said image pickup signal input is said first of the image pickup signals by using said correction information.

16. A characteristic correction apparatus for image pickup signals provided by an image pickup apparatus comprising:
said image pickup apparatus producing image information signals related to processing of an image,
a storage section in which correction information of correcting an uncorrected image pickup signal into a corrected image pickup signal is stored,
a correction section of correcting a predetermined characteristic so that said uncorrected image pickup signal input is corrected to said corrected image pickup signal by using said correction information, and
said correction information is selected in response to the image information signals produced by said image pickup apparatus, wherein
said uncorrected image pickup signal is an image pickup signal having a film gamma characteristic and said corrected image pickup signal is an image pickup signal having a predetermined gamma characteristic, and
said predetermined gamma characteristic is a gamma characteristic depending on which a signal larger than an output signal obtained from said film gamma characteristic and not larger than an output signal obtained from a video gamma characteristic is obtained at any given incident light amount used during image pickup.

* * * * *